US011273697B2

(12) United States Patent
Matecki et al.

(10) Patent No.: US 11,273,697 B2
(45) Date of Patent: Mar. 15, 2022

(54) BATTERY SUPPORT AND PROTECTION STRUCTURE FOR A VEHICLE

(71) Applicant: Shape Corp., Grand Haven, MI (US)

(72) Inventors: Joseph R. Matecki, Allendale, MI (US); Dennis V. Rupar, Spring Lake, MI (US); James H. Dodd, Grand Haven, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 16/815,517

(22) Filed: Mar. 11, 2020

(65) Prior Publication Data

US 2020/0207221 A1 Jul. 2, 2020

Related U.S. Application Data

(63) Continuation of application No. 15/679,702, filed on Aug. 17, 2017, now Pat. No. 10,632,857.

(Continued)

(51) Int. Cl.
*B60K 1/04* (2019.01)
*B60L 50/60* (2019.01)
(Continued)

(52) U.S. Cl.
CPC ............. *B60K 1/04* (2013.01); *B60L 50/64* (2019.02); *B60L 50/66* (2019.02); *H01M 50/20* (2021.01); *B60K 6/28* (2013.01); *B60K 6/405* (2013.01); *B60K 2001/0438* (2013.01); *B60R 16/04* (2013.01); *B60Y 2306/01* (2013.01); *Y02T 10/70* (2013.01)

(58) Field of Classification Search
CPC ..................................... H01M 50/20
See application file for complete search history.

(56) References Cited

U.S. PATENT DOCUMENTS 3,708,028 A  1/1973 Hafer
3,930,552 A  1/1976 Kunkle et al.
(Continued)

FOREIGN PATENT DOCUMENTS

AT  511428 A1  11/2012
AT  511670 A1   1/2013
(Continued)

OTHER PUBLICATIONS

International Searching Authority (KR), International Search Report and Written Opinion for International Application No. PCT/IB2017/055002, dated Jul. 19, 2018.

(Continued)

*Primary Examiner* — Olatunji A Godo
(74) *Attorney, Agent, or Firm* — Bodman PLC

(57) ABSTRACT

A battery support structure for a vehicle includes a first peripheral member configured to be supported by a longitudinal section of a vehicle frame. A second peripheral member has an end surface that selectively attaches at an inside surface of the first peripheral member to enclose a corner section of a battery containment area. Prior to fixed attachment of the first and second peripheral members, a slip plane is defined between the end surface and the inside surface to adjust the second peripheral member along the first peripheral member to a predefined dimension of the battery containment area.

20 Claims, 20 Drawing Sheets

Related U.S. Application Data

(60) Provisional application No. 62/376,135, filed on Aug. 17, 2016.

(51) Int. Cl.
  *B60L 50/64* (2019.01)
  *H01M 50/20* (2021.01)
  *B60K 6/28* (2007.10)
  *B60K 6/405* (2007.10)
  *B60R 16/04* (2006.01)

(56) References Cited

U.S. PATENT DOCUMENTS

| | | |
|---|---|---|
| 3,983,952 A | 10/1976 | McKee |
| 4,174,014 A | 11/1979 | Bjorksten |
| 4,252,206 A | 2/1981 | Burkholder et al. |
| 4,317,497 A | 3/1982 | Alt et al. |
| 4,339,015 A | 7/1982 | Fowkes et al. |
| 4,506,748 A | 3/1985 | Thomas |
| 5,015,545 A | 5/1991 | Brooks |
| 5,198,638 A | 3/1993 | Massacesi |
| 5,378,555 A | 1/1995 | Waters et al. |
| 5,390,754 A | 2/1995 | Masuyama et al. |
| 5,392,873 A | 2/1995 | Masuyama et al. |
| 5,476,151 A | 12/1995 | Tsuchida et al. |
| 5,501,289 A | 3/1996 | Nishikawa et al. |
| 5,513,721 A | 5/1996 | Ogawa et al. |
| 5,523,666 A | 6/1996 | Hoelzl et al. |
| 5,534,364 A | 7/1996 | Watanabe et al. |
| 5,549,443 A | 8/1996 | Hammerslag |
| 5,555,950 A | 9/1996 | Harada et al. |
| 5,558,949 A | 9/1996 | Iwatsuki et al. |
| 5,561,359 A | 10/1996 | Matsuura et al. |
| 5,567,542 A | 10/1996 | Bae |
| 5,585,204 A | 12/1996 | Oshida et al. |
| 5,585,205 A | 12/1996 | Kohchi |
| 5,612,606 A | 3/1997 | Guimarin et al. |
| 5,620,057 A | 4/1997 | Klemen et al. |
| 5,709,280 A | 1/1998 | Beckley et al. |
| 5,736,272 A | 4/1998 | Veenstra et al. |
| 5,760,569 A | 6/1998 | Chase, Jr. |
| 5,833,023 A | 11/1998 | Shimizu |
| 5,853,058 A | 12/1998 | Endo et al. |
| 5,866,276 A | 2/1999 | Ogami et al. |
| 5,934,053 A | 8/1999 | Fillman et al. |
| 6,040,080 A | 3/2000 | Minami et al. |
| 6,079,984 A | 6/2000 | Torres et al. |
| 6,085,854 A | 7/2000 | Nishikawa |
| 6,094,927 A | 8/2000 | Anazawa et al. |
| 6,109,380 A | 8/2000 | Veenstra |
| 6,130,003 A | 10/2000 | Etoh et al. |
| 6,158,538 A | 12/2000 | Botzelmann et al. |
| 6,188,574 B1 | 2/2001 | Anazawa |
| 6,189,635 B1 | 2/2001 | Schuler et al. |
| 6,220,380 B1 | 4/2001 | Mita et al. |
| 6,227,322 B1 | 5/2001 | Nishikawa |
| 6,260,645 B1 | 7/2001 | Pawlowski et al. |
| 6,402,229 B1 | 6/2002 | Suganuma |
| 6,406,812 B1 | 6/2002 | Dreulle et al. |
| 6,462,949 B1 | 10/2002 | Parish, IV et al. |
| 6,541,151 B2 | 4/2003 | Minamiura et al. |
| 6,541,154 B2 | 4/2003 | Oogami et al. |
| 6,565,836 B2 | 5/2003 | Ovshinsky et al. |
| 6,598,691 B2 | 7/2003 | Mita et al. |
| 6,648,090 B2 | 11/2003 | Iwase |
| 6,668,957 B2 | 12/2003 | King |
| 6,736,229 B1 | 5/2004 | Amori et al. |
| 6,811,197 B1 | 11/2004 | Grabowski et al. |
| 7,004,274 B2 | 2/2006 | Shibasawa et al. |
| 7,017,361 B2 | 3/2006 | Kwon |
| 7,070,015 B2 | 7/2006 | Mathews et al. |
| 7,128,999 B1 | 10/2006 | Martin et al. |
| 7,201,384 B2 | 4/2007 | Chaney |
| 7,207,405 B2 | 4/2007 | Reid et al. |
| 7,221,123 B2 | 5/2007 | Chen |
| 7,249,644 B2 | 7/2007 | Honda et al. |
| 7,267,190 B2 | 9/2007 | Hirano |
| 7,323,272 B2 | 1/2008 | Ambrosio et al. |
| 7,401,669 B2 | 7/2008 | Fujii et al. |
| 7,405,022 B2 | 7/2008 | Kang et al. |
| 7,412,309 B2 | 8/2008 | Honda |
| 7,416,039 B1 | 8/2008 | Anderson et al. |
| 7,424,926 B2 | 9/2008 | Tsuchiya |
| 7,427,156 B2 | 9/2008 | Ambrosio et al. |
| 7,501,793 B2 | 3/2009 | Kadouchi et al. |
| 7,507,499 B2 | 3/2009 | Zhou et al. |
| 7,520,355 B2 | 4/2009 | Chaney |
| 7,610,978 B2 | 11/2009 | Takasaki et al. |
| 7,654,351 B2 | 2/2010 | Koike et al. |
| 7,654,352 B2 | 2/2010 | Takasaki et al. |
| 7,661,370 B2 | 2/2010 | Pike et al. |
| 7,686,111 B2 | 3/2010 | Koenekamp et al. |
| 7,687,192 B2 | 3/2010 | Yoon et al. |
| 7,713,655 B2 | 5/2010 | Ha et al. |
| 7,749,644 B2 | 7/2010 | Nishino |
| 7,807,288 B2 | 10/2010 | Yoon et al. |
| 7,854,282 B2 | 12/2010 | Lee et al. |
| 7,858,229 B2 | 12/2010 | Shin et al. |
| 7,875,378 B2 | 1/2011 | Yang et al. |
| 7,879,480 B2 | 2/2011 | Yoon et al. |
| 7,879,485 B2 | 2/2011 | Yoon et al. |
| 7,926,602 B2 | 4/2011 | Takasaki |
| 7,931,105 B2 | 4/2011 | Sato et al. |
| 7,948,207 B2 | 5/2011 | Scheucher |
| 7,967,093 B2 | 6/2011 | Nagasaka |
| 7,984,779 B2 | 7/2011 | Boegelein et al. |
| 7,990,105 B2 | 8/2011 | Matsumoto et al. |
| 7,993,155 B2 | 8/2011 | Heichal et al. |
| 7,997,368 B2 | 8/2011 | Takasaki et al. |
| 8,006,626 B2 | 8/2011 | Kumar et al. |
| 8,006,793 B2 | 8/2011 | Heichal et al. |
| 8,012,620 B2 | 9/2011 | Takasaki et al. |
| 8,034,476 B2 | 10/2011 | Ha et al. |
| 8,037,954 B2 | 10/2011 | Taguchi |
| 8,079,435 B2 | 12/2011 | Takasaki et al. |
| 8,091,669 B2 | 1/2012 | Taneda et al. |
| 8,110,300 B2 | 2/2012 | Niedzwiecki et al. |
| 8,146,694 B2 | 4/2012 | Hamidi |
| 8,163,420 B2 | 4/2012 | Okada et al. |
| 8,167,070 B2 | 5/2012 | Takamura et al. |
| 8,186,468 B2 | 5/2012 | Parrett et al. |
| 8,187,736 B2 | 5/2012 | Park et al. |
| 8,205,702 B2 | 6/2012 | Hoermandinger et al. |
| 8,206,846 B2 | 6/2012 | Yang et al. |
| 8,210,301 B2 | 7/2012 | Hashimoto et al. |
| 8,211,564 B2 | 7/2012 | Choi et al. |
| 8,256,552 B2 | 9/2012 | Okada |
| 8,268,469 B2 | 9/2012 | Hermann et al. |
| 8,268,472 B2 | 9/2012 | Ronning et al. |
| 8,276,697 B2 | 10/2012 | Takasaki |
| 8,286,743 B2 | 10/2012 | Rawlinson |
| 8,298,698 B2 | 10/2012 | Chung et al. |
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |

(56) References Cited

U.S. PATENT DOCUMENTS

| | | |
|---|---|---|
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |

(56) References Cited

U.S. PATENT DOCUMENTS

| | | |
|---|---|---|
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2007/0296290 A1 | 12/2007 | Tsukashima et al. |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307348 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0125704 A1* | 5/2012 | Kawaguchi ............ H01M 50/20 180/68.5 |
| 2012/0129031 A1 | 5/2012 | Kim |
| 2012/0160088 A1* | 6/2012 | Rawlinson ............... F41H 7/042 89/36.08 |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0204583 A1 | 7/2015 | Stephan et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1 | 9/2015 | Deckard et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |

(56) References Cited

U.S. PATENT DOCUMENTS

| | | |
|---|---|---|
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010007414 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |

(56) References Cited

FOREIGN PATENT DOCUMENTS

| | | |
|---|---|---|
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | WO-0074964 A1 | 12/2000 |
| WO | WO-2006100005 A2 | 9/2006 |
| WO | WO-2006100006 A1 | 9/2006 |

(56) References Cited

FOREIGN PATENT DOCUMENTS

| | | |
|---|---|---|
| WO | WO-2008104356 A1 | 9/2008 |
| WO | WO-2008104358 A1 | 9/2008 |
| WO | WO-2008104376 A1 | 9/2008 |
| WO | WO-2008131935 A2 | 11/2008 |
| WO | WO-2009080151 A1 | 7/2009 |
| WO | WO-2009080166 A1 | 7/2009 |
| WO | WO-2009103462 A1 | 8/2009 |
| WO | WO-2010004192 A2 | 1/2010 |
| WO | WO-2010012337 A1 | 2/2010 |
| WO | WO-2010012338 A1 | 2/2010 |
| WO | WO-2010012342 A1 | 2/2010 |
| WO | WO-2010040520 A2 | 4/2010 |
| WO | WO-2010063365 A1 | 6/2010 |
| WO | WO-2010069713 A1 | 6/2010 |
| WO | WO-2010076053 A1 | 7/2010 |
| WO | WO-2010076055 A1 | 7/2010 |
| WO | WO-2010076452 A1 | 7/2010 |
| WO | WO-2011030041 A1 | 3/2011 |
| WO | WO-2011083980 A2 | 7/2011 |
| WO | WO-2011106851 A2 | 9/2011 |
| WO | WO-2011116801 A1 | 9/2011 |
| WO | WO-2011116959 A2 | 9/2011 |
| WO | WO-2011121757 A1 | 10/2011 |
| WO | WO-2011134815 A1 | 11/2011 |
| WO | WO-2011134828 A1 | 11/2011 |
| WO | WO-2012025710 A2 | 3/2012 |
| WO | WO-2012063025 A2 | 5/2012 |
| WO | WO-2012065853 A1 | 5/2012 |
| WO | WO-2012065855 A1 | 5/2012 |
| WO | WO-2012069349 A1 | 5/2012 |
| WO | WO-2012084132 A2 | 6/2012 |
| WO | WO-2012093233 A1 | 7/2012 |
| WO | WO-2012097514 A1 | 7/2012 |
| WO | WO-2012114040 A1 | 8/2012 |
| WO | WO-2012116608 A1 | 9/2012 |
| WO | WO-2012119424 A1 | 9/2012 |
| WO | WO-2012163504 A2 | 12/2012 |
| WO | WO-2013020707 A2 | 2/2013 |
| WO | WO-2013027982 A2 | 2/2013 |
| WO | WO-2013042628 A1 | 3/2013 |
| WO | WO-2013080008 A2 | 6/2013 |
| WO | WO-2013188680 A1 | 12/2013 |
| WO | WO-2014114511 A1 | 7/2014 |
| WO | WO-2014140412 A1 | 9/2014 |
| WO | WO-2014140463 A1 | 9/2014 |
| WO | WO-2014183995 A1 | 11/2014 |
| WO | WO-2014191651 A2 | 12/2014 |
| WO | WO-2015018658 A1 | 2/2015 |
| WO | WO-2015043869 A1 | 4/2015 |
| WO | WO-2015149660 A1 | 10/2015 |
| WO | WO-2016029084 A1 | 2/2016 |
| WO | WO-2016046144 A1 | 3/2016 |
| WO | WO-2016046145 A1 | 3/2016 |
| WO | WO-2016046146 A1 | 3/2016 |
| WO | WO-2016046147 A1 | 3/2016 |
| WO | WO-2016072822 A1 | 5/2016 |
| WO | WO-2016086274 A1 | 6/2016 |
| WO | WO-2016106658 A1 | 7/2016 |
| WO | WO-2016132280 A1 | 8/2016 |
| WO | WO-2016203130 A1 | 12/2016 |
| WO | WO-2017025592 A1 | 2/2017 |
| WO | WO-2017032571 A1 | 3/2017 |
| WO | WO-2017060608 A1 | 4/2017 |
| WO | WO-2017084938 A1 | 5/2017 |
| WO | WO-2017103449 A1 | 6/2017 |
| WO | WO-2018033880 A2 | 2/2018 |
| WO | WO-2018065554 A1 | 4/2018 |
| WO | WO-2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searhcing Authority, International Search Report and Written Opinion for Application No. PCT/IB2018/050066, dated Apr. 26, 2018.

Korean Intellectual Property Office (ISA), International Search Report and Written Opinion for International Application No. PCT/US2018/033009, dated Sep. 11, 2018.

Korean Intellectual Property Office (ISA), International Search Report and Written Opinion for International Application No. PCT/US2018/032760, dated Sep. 11, 2018.

Korean Intellectual Property Office (ISA), International Search Report and Written Opinion for International Application No. PCT/US2018/050889, dated Mar. 21, 2019.

Korean Intellectual Propery Office (ISA), International Search Report and Written Opinion for International Application No. PCT/US2018/054423, dated Jan. 28, 2019.

* cited by examiner

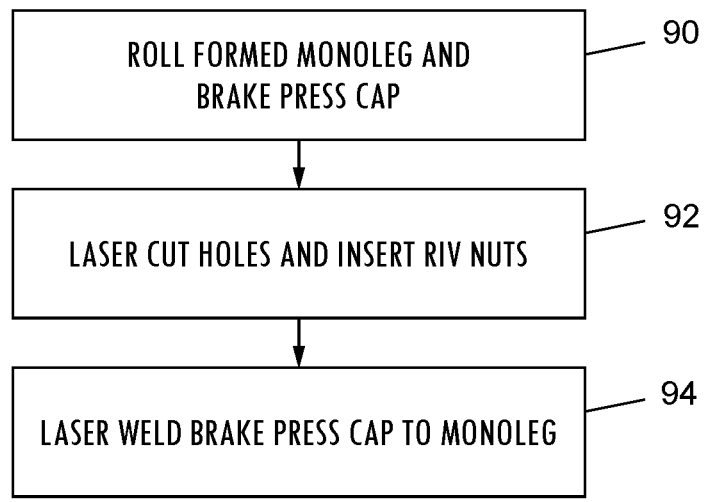
FIG. 21
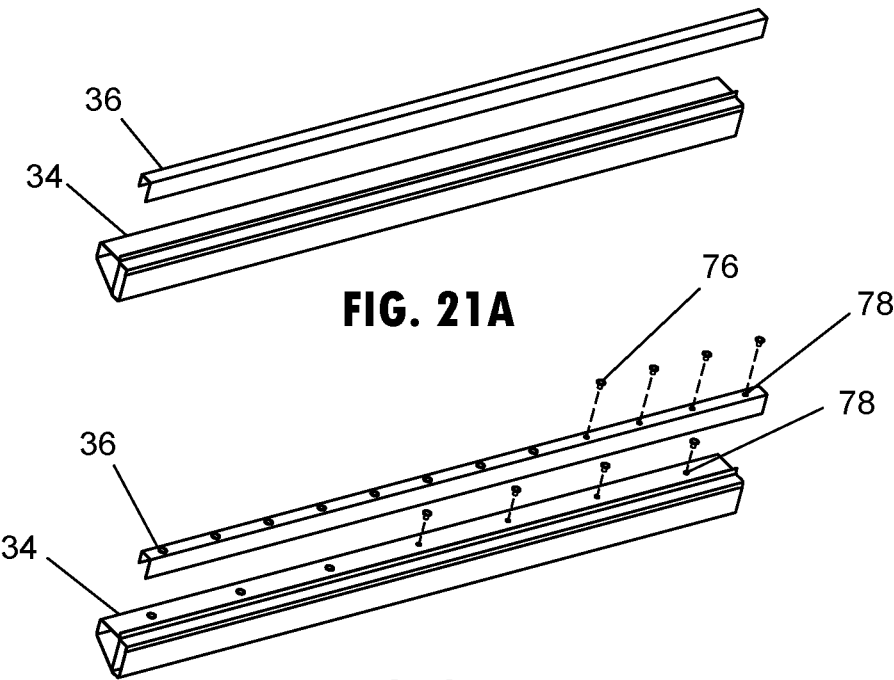
FIG. 21A
FIG. 21B
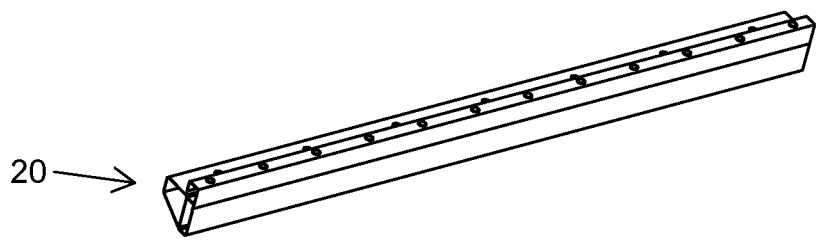
FIG. 21C

BATTERY SUPPORT AND PROTECTION STRUCTURE FOR A VEHICLE

CROSS-REFERENCE TO RELATED APPLICATION

This application is a Continuation Application of U.S. nonprovisional application Ser. No. 15/679,702, filed Aug. 17, 2017, which claims benefit and priority under 35 U.S.C. § 119(e) of U.S. provisional application Ser. No. 62/376,135, filed Aug. 17, 2016, the contents of which are hereby incorporated herein by reference in their entireties.

FIELD OF THE INVENTION

The present invention generally relates to vehicle battery support structures, and more particularly to structural components and protective enclosures for concealing and protecting vehicle electronic components and batteries, such as battery packs or modules or the like for electric and hybrid-electric vehicles.

BACKGROUND OF THE INVENTION

Electric and hybrid-electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle. Similar to other vehicle components, low weight and high strength-to-weight ratio are important properties in battery support structural components.

SUMMARY OF THE PRESENT INVENTION

The present invention provides a vehicle battery support structure or tray that is configured to support and protect battery packs or modules or the like for electric and hybrid-electric vehicles. A side reinforcement member of the battery support structure may form part of a peripheral wall that surrounds the battery containment area and may include a beam adapted to absorb and reduce impact forces delivered to exterior portions of the side reinforcement member. The side reinforcement member and other components of the battery support structure may also be formed with slip planes to provide adjustment points for use prior to welding or fixing the battery support structure to form a battery containment area with precise selected or predefined dimensional specifications, such as to provide a sealed interior compartment. The side reinforcement member and other components of the battery support structure may also provide load paths for transferring lateral impact forces around the battery containment area and limiting resulting disruption to the supported batteries and containment area.

According to one aspect of the present invention, a battery support structure for a vehicle includes a first peripheral member configured to be supported by a longitudinal section of a vehicle frame. A second peripheral member has an end surface that selectively attaches at an inside surface of the first peripheral member to enclose a corner section of a containment area. Prior to fixed attachment of the first and second peripheral members, a slip plane is defined between the end surface and the inside surface to adjust the second peripheral member along the first peripheral member to a predefined dimension of the containment area.

According to another aspect of the present invention, a battery support structure for a vehicle includes a pair of side peripheral members that are configured to attach at longitudinal sections or rails or sills or the like at opposing sides of a vehicle frame. An end peripheral member extends laterally between the side members to generally enclose a front or a rear of a battery containment area. The opposing ends of the end peripheral member selectively attach at inside surfaces of the side peripheral members. Prior to fixed attachment of the end peripheral member at the side members, slip planes are defined between the ends of the end peripheral member and the inside surfaces. The slip planes are configured to longitudinally adjust the end peripheral member relative to the side peripheral members to form the battery containment area with a predefined longitudinal dimension.

According to yet another aspect of the present invention, a method of forming a battery support structure for a vehicle includes providing a pair of side reinforcement members configured to attach at opposing rocker rails of a vehicle frame. Front and rear members are longitudinally adjusted along slip planes defined between ends of the front and rear member and inside vertical surfaces of the pair of side reinforcement members to a predefined longitudinal distance between the front and rear members. The front and rear member are welded to the pair of side reinforcement member to fix the predefined longitudinal distance between the front and rear members and to form a battery containment area. Optionally, a base plate may be attached along lower surfaces of the pair of side reinforcement members and the front and rear member, such that the base plate spans generally below the side reinforcement members and the front and rear members to provide a bottom surface of the battery containment area. Also, a plurality of cross members may optionally attach at the pair of side reinforcement members, so as to span laterally between the reinforcement members for lateral impact forces to be transmitted through load paths along the cross members.

These and other objects, advantages, purposes, and features of the present invention will become apparent upon review of the following specification in conjunction with the drawings.

BRIEF DESCRIPTION OF THE DRAWINGS

FIG. 21 is a flow chart of the process of forming a side reinforcement member of the batter support structure;

FIGS. 21A-21C are upper perspective views of the side reinforcement member at different steps of the forming process shown in FIG. 21;

DETAILED DESCRIPTION OF EMBODIMENTS

Figure 1:
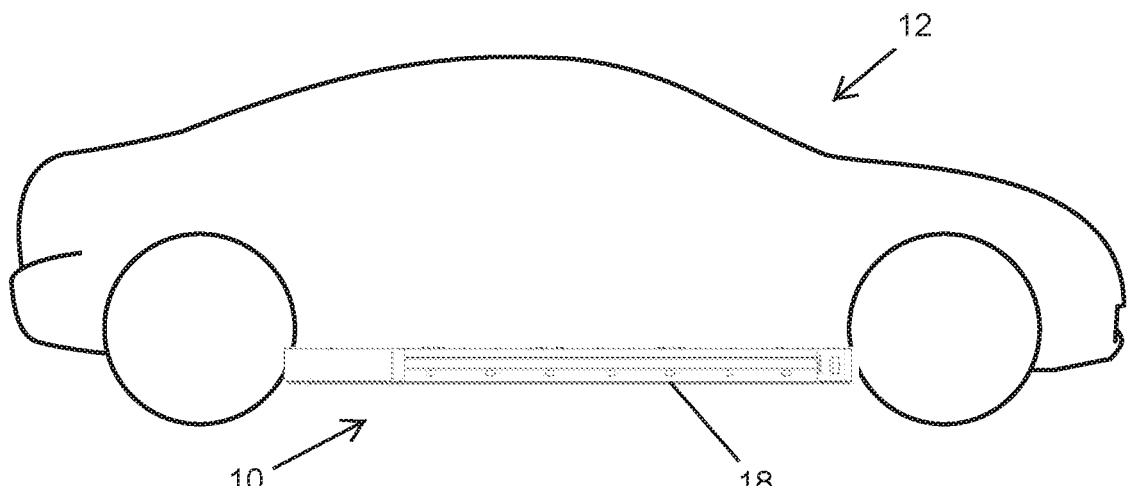
FIG. 1 is a side elevational view of a battery support structure disposed at a mounting location on a vehicle in accordance with the present invention.
Figure 2:
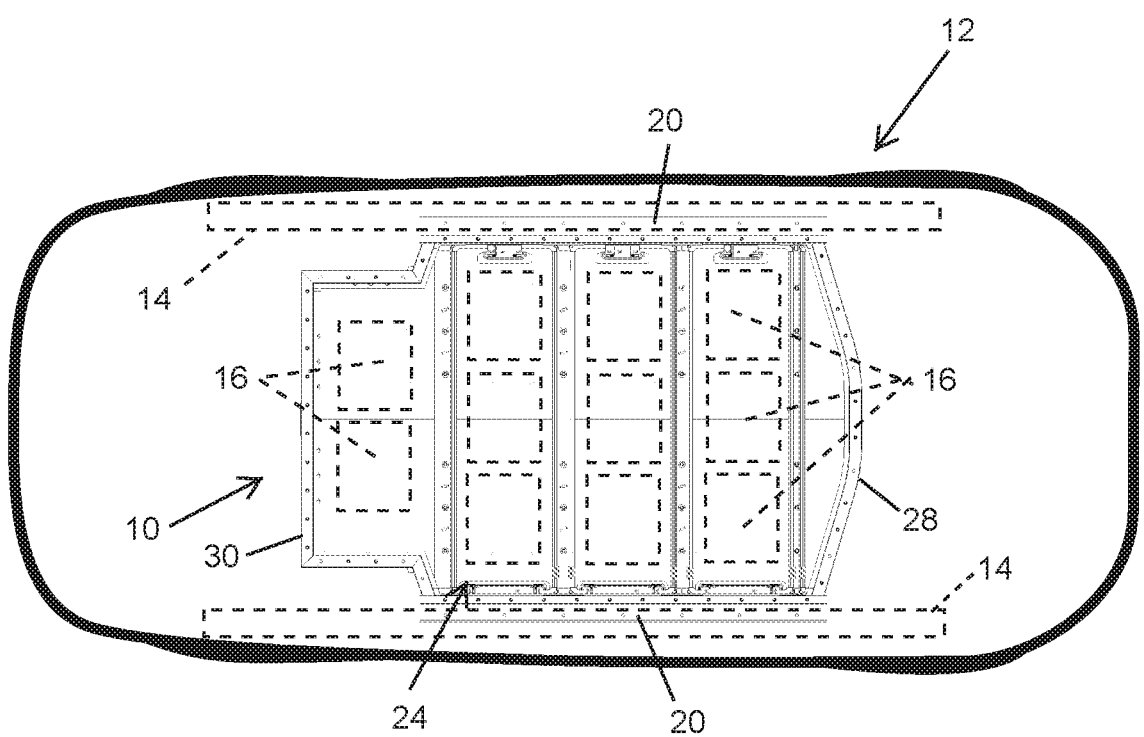
FIG. 2 is top plan view of the battery support structure and outline of the vehicle shown in FIG. 1, illustrating rocker rails of the vehicle and several battery modules held in the battery support structure in dashed lines.

Referring now to the drawings and the illustrative embodiment depicted therein, a vehicle battery support tray or structure 10 is provided for supporting and protecting battery packs or modules or the like, such as for an electric or hybrid-electric vehicle 12 (FIGS. 1 and 2). The battery support structure 10 may be attached or mounted at or near the lower frame or rocker rails 14 of the vehicle 12, so as to locate the battery modules 16 that are contained generally in a central location on the vehicle 12 (FIG. 2), away from probable impact locations, and also in a location that evenly distributes the weight of the battery modules 16 and provides the vehicle with a relatively low center of gravity. It is contemplated that the battery support structure 10 may be disengaged or detached from the rocker rails 14 of the vehicle 12, such as for replacing or performing maintenance on the battery modules 16 or related electrical components. To facilitate this optional disengagement or detachment, the battery support structure 10 can be a modular design with standardized mounting locations capable of disengagement, such as with bolts or releasable fasteners or the like. Also, the battery support structure 10 may be provided with a base plate 18 or panel that is generally unobstructed to form the lowermost undercarriage surface of the vehicle body. Accordingly, the battery support structure 10, such as shown in FIG. 1, may span below the vehicle with a generally thin profile, so as to accommodate various vehicle body types and designs.

Figure 18:
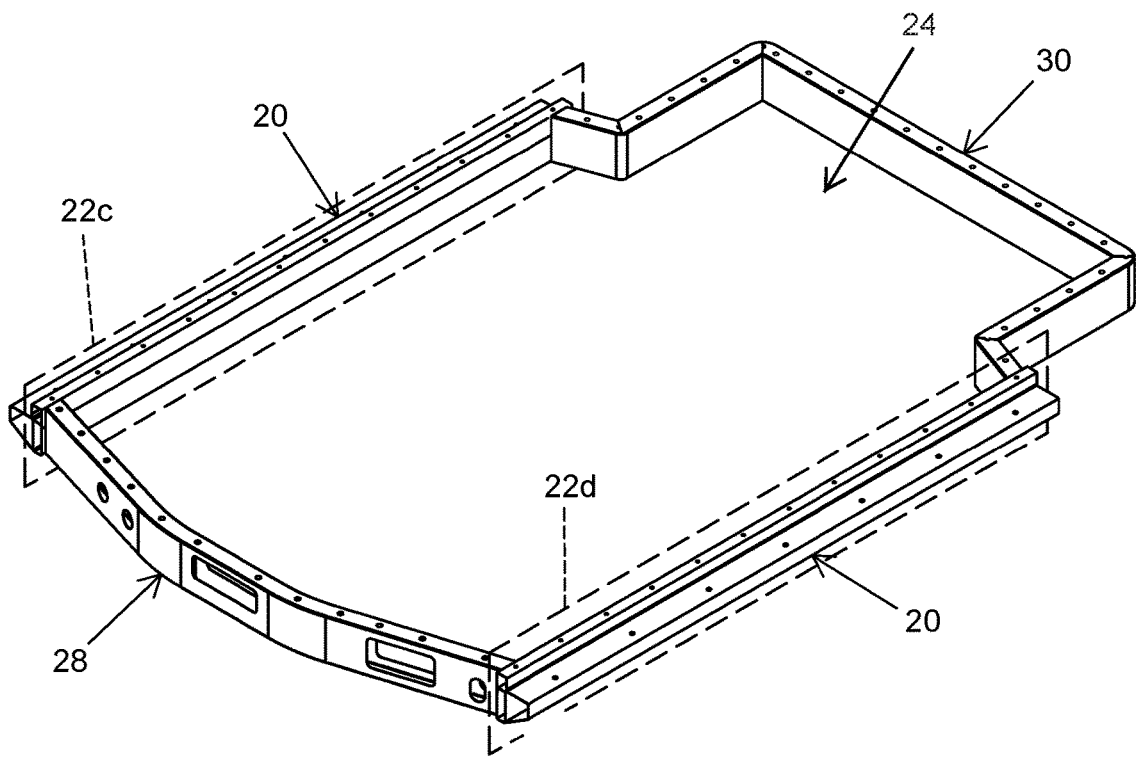
FIG. 18 is an upper perspective view of the side reinforcement members and the front and rear members of the battery support structure shown in FIG. 3, illustrating two slip planes.

The battery support structure 10 includes side reinforcement members 20 or beams that form side portions or walls of a vehicle battery support structure 10. The side reinforcement members 20 and other components and portions of the battery support structure 10 may be formed with engineered slip planes, such as shown at slip planes 22a, 22b (FIG. 12) along the upper beams 36 of the side reinforcement members 20 and at slip planes 22c, 22d (FIG. 18) at the ends of the front and rear members 28, 30. These slip planes provide adjustment points during the assembly and formation processes, such as to enable the battery support structure 10 to enclose a battery containment area 24 in a sealed manner with precise selected or predefined dimensional specifications. The slip planes 22a-22d are also provided so as not to interrupt or compromise load paths for transferring lateral impact forces around the battery containment area and for limiting disruption to the battery modules 16 supported in the battery containment area.

Figure 12:
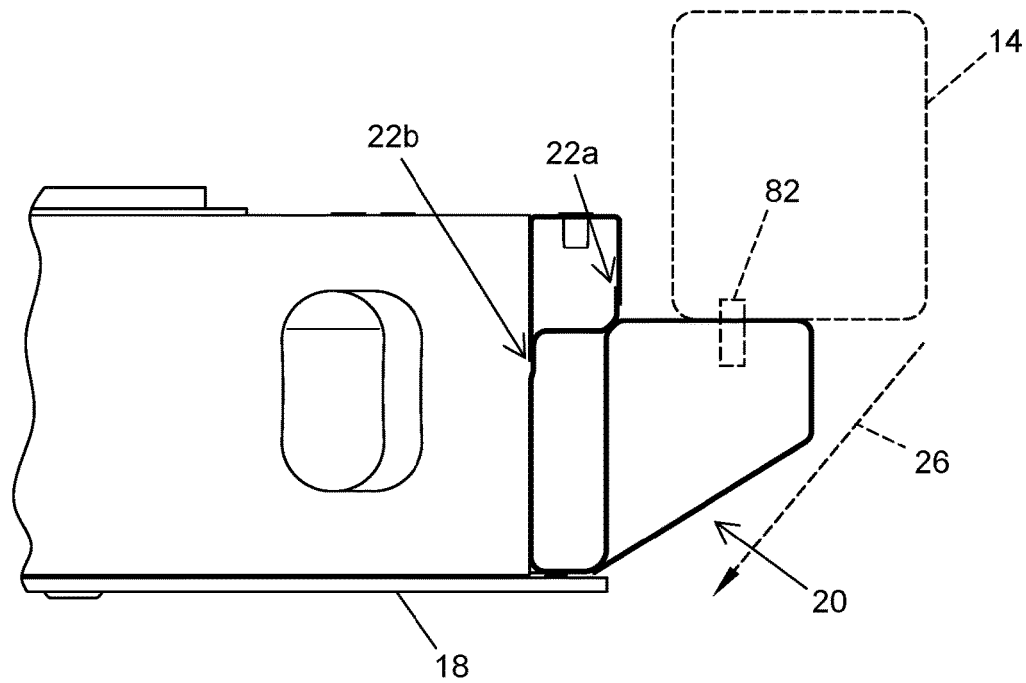
FIG. 12 is a front elevational view of a front corner portion of the battery support structure shown in FIG. 7, illustrating a rocker rail of a vehicle attached at a side reinforcement member of the battery support structure.

The side reinforcement members 20 may be attached to a rocker rail 14 of the vehicle 12 to secure the vehicle battery support structure 10 to the vehicle frame and suspend it away from the ground surface, such as shown in FIG. 12 at an inboard location that does not substantially come into a line of sight 26 of a person standing outside of the vehicle 12. Accordingly, the illustrated battery support structure 10 may span laterally across the vehicle between the rocker rails 14 and may also extends longitudinaly generally between the axles or wheel locations of the vehicle 12, such that lateral impact or collision-related forces may be transmitted from the rocker rails 14 to a side reinforcement member 20 and laterally across the vehicle through load paths along the cross, front, and/or rear members of the battery support structure 10, to thereby prevent damage to the batteries contained in the support structure.

Figure 3:
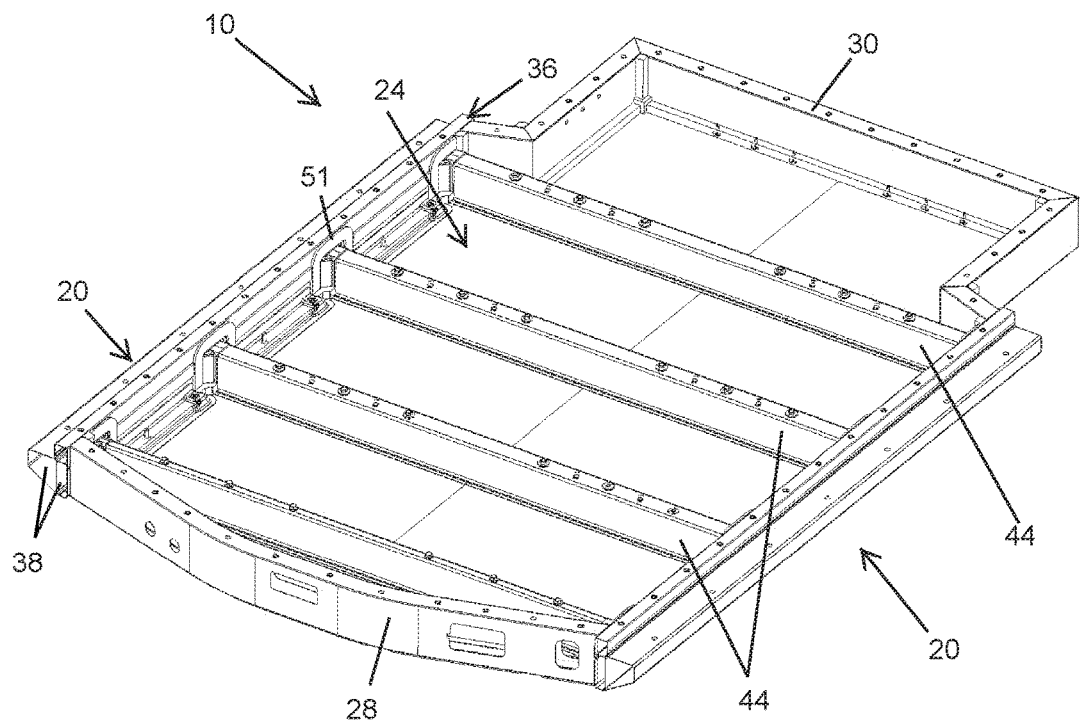
FIG. 3 is a front upper perspective view of the battery support structure shown in FIG. 1, illustrated separated or detached from a vehicle.
Figure 4:
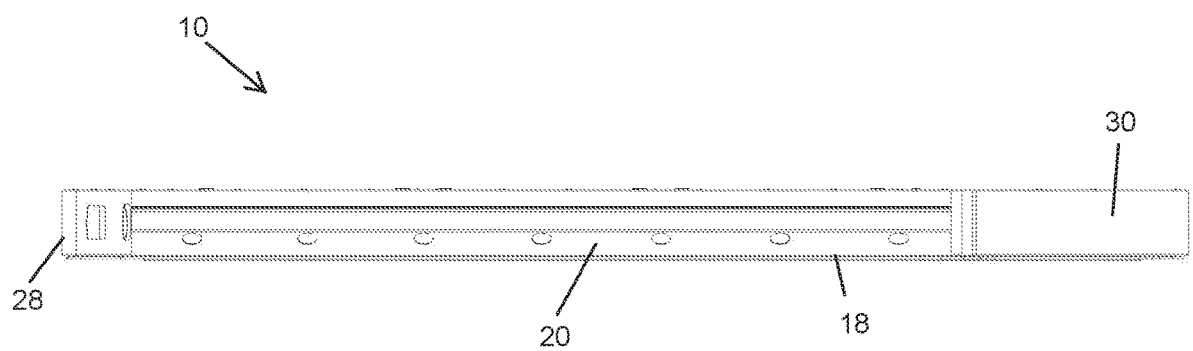
FIG. 4 is a side elevational view of the battery support structure shown in FIG. 3.
Figure 5:
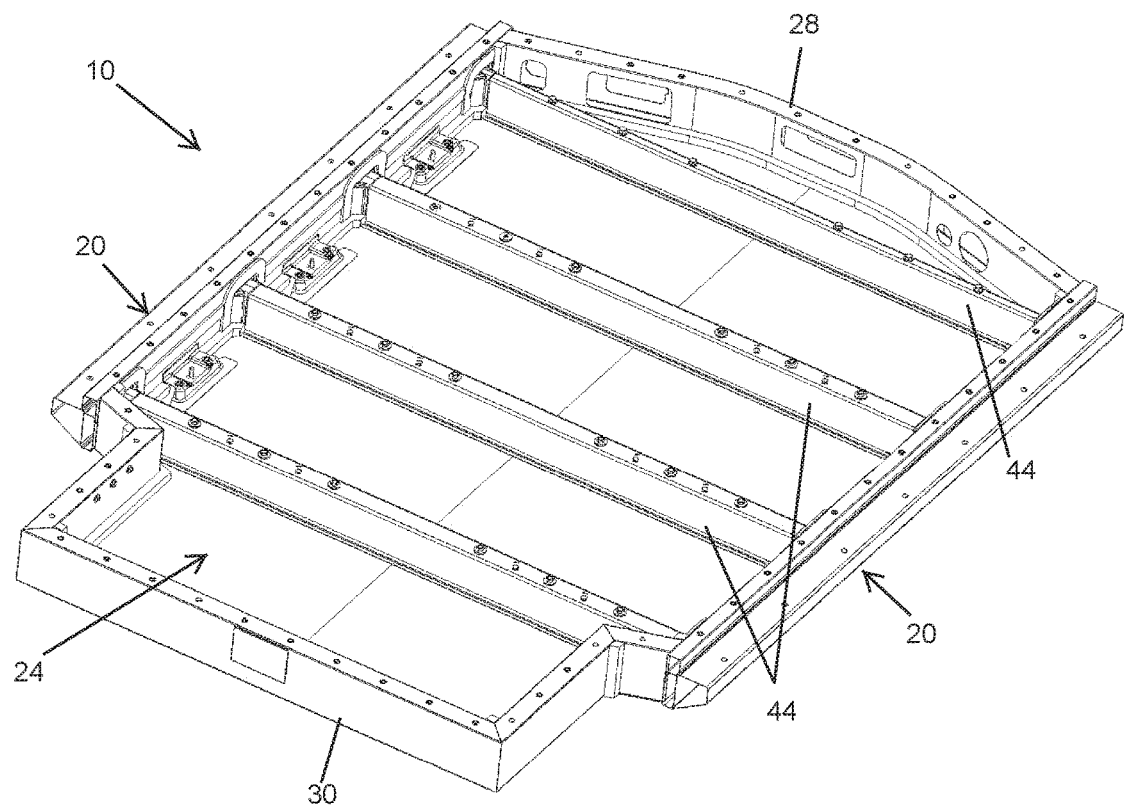
FIG. 5 is a rear upper perspective view of the battery support structure shown in FIG. 3.
Figure 6:
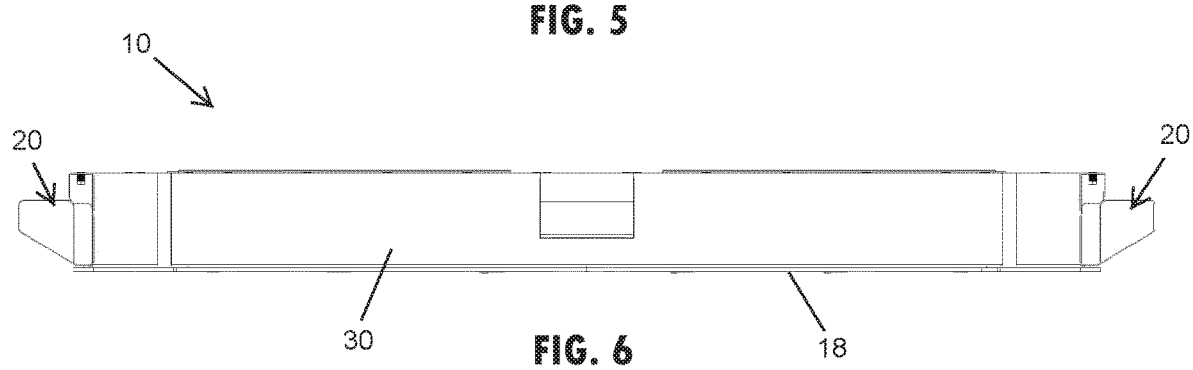
FIG. 6 is a rear elevational view of the battery support structure shown in FIG. 3.
Figure 7:
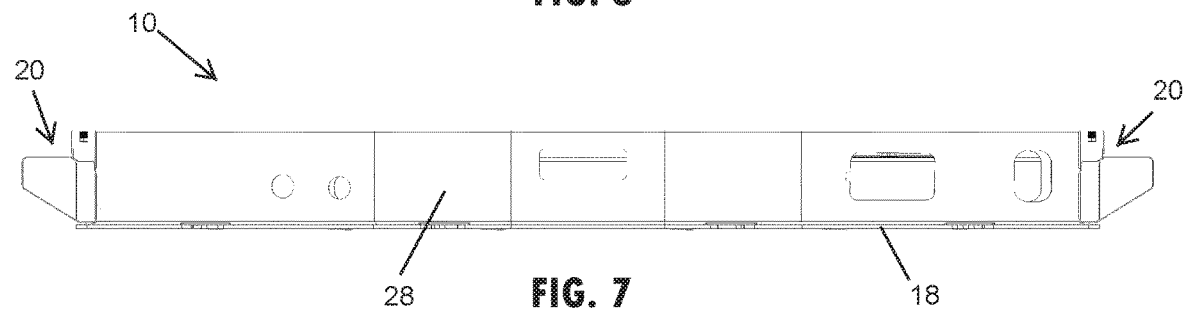
FIG. 7 is a front elevational view of the battery support structure shown in FIG. 3.
Figure 8:
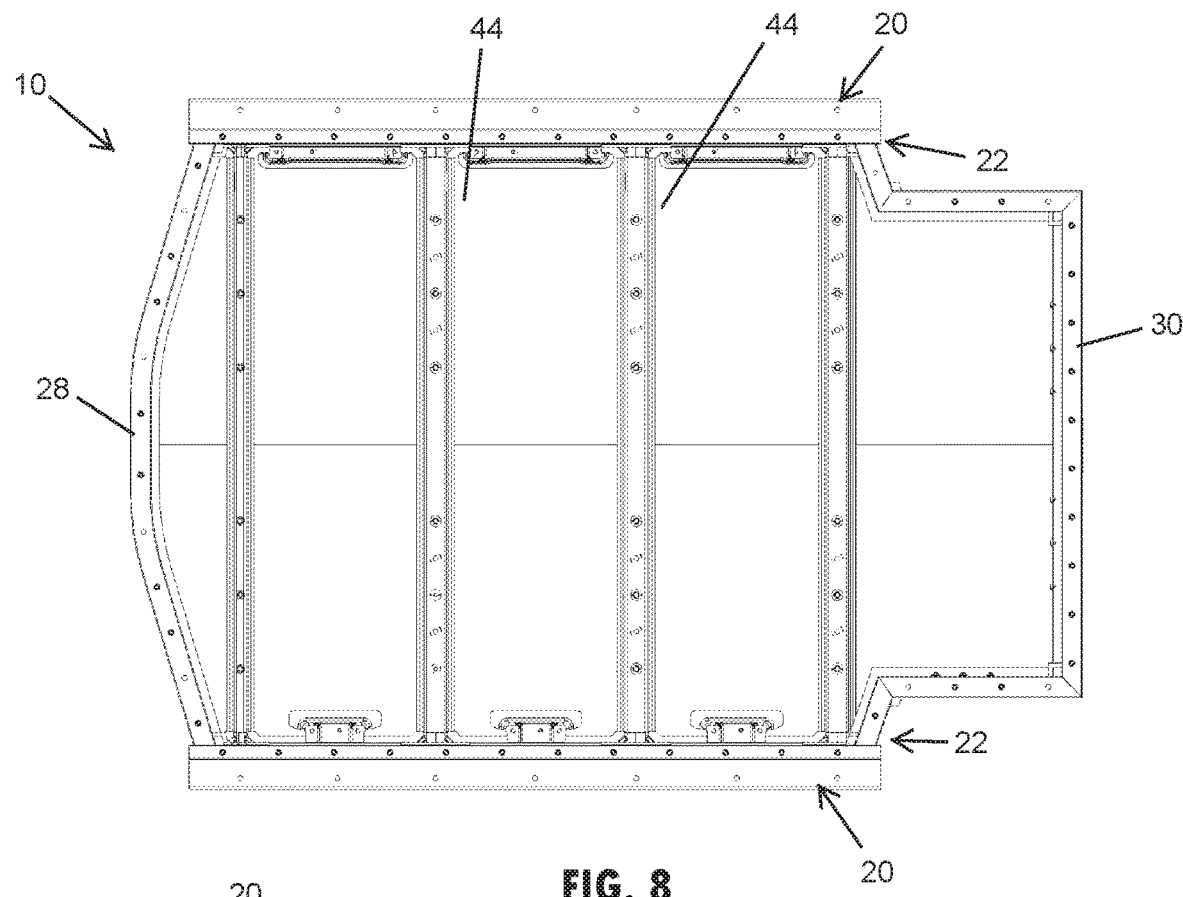
FIG. 8 is a top plan view of the battery support structure shown in FIG. 3.
Figure 9:
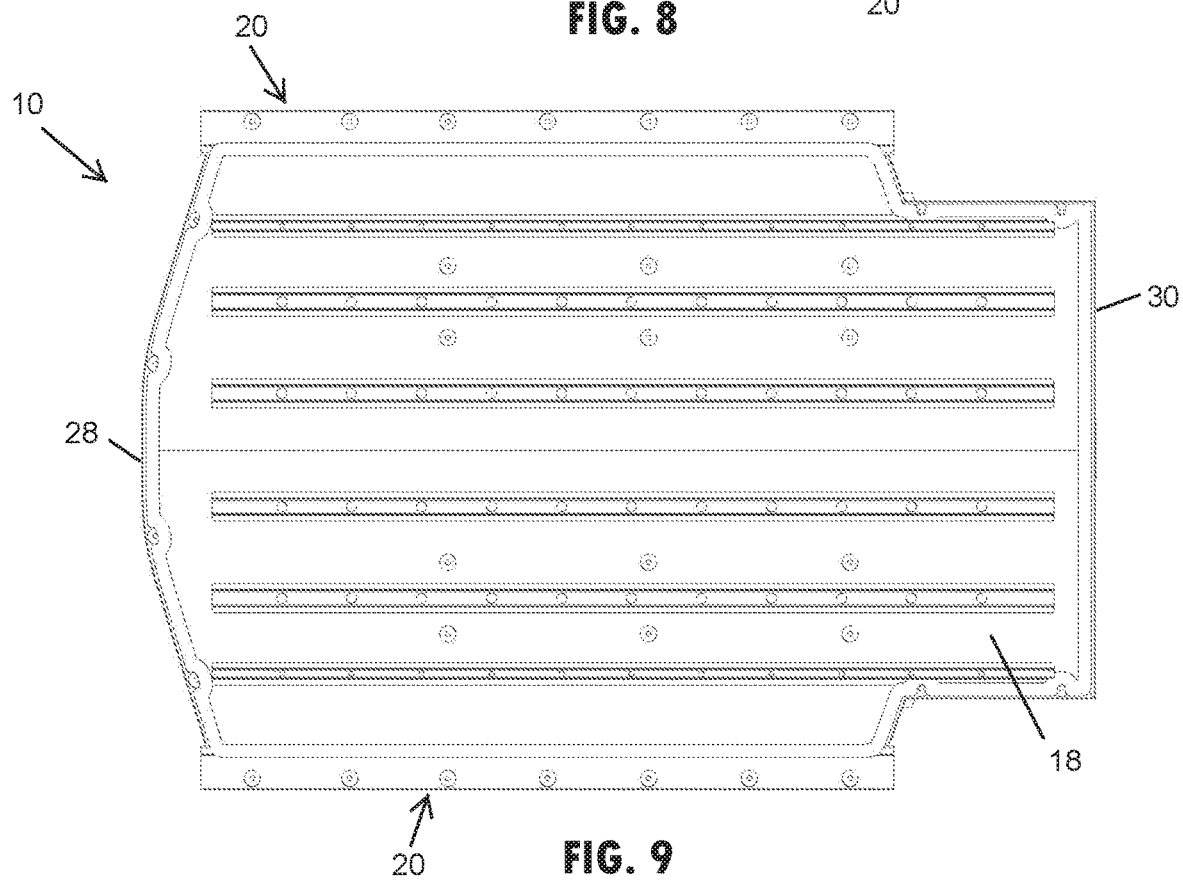
FIG. 9 is a bottom plan view of the battery support structure shown in FIG. 3.
Figure 10:
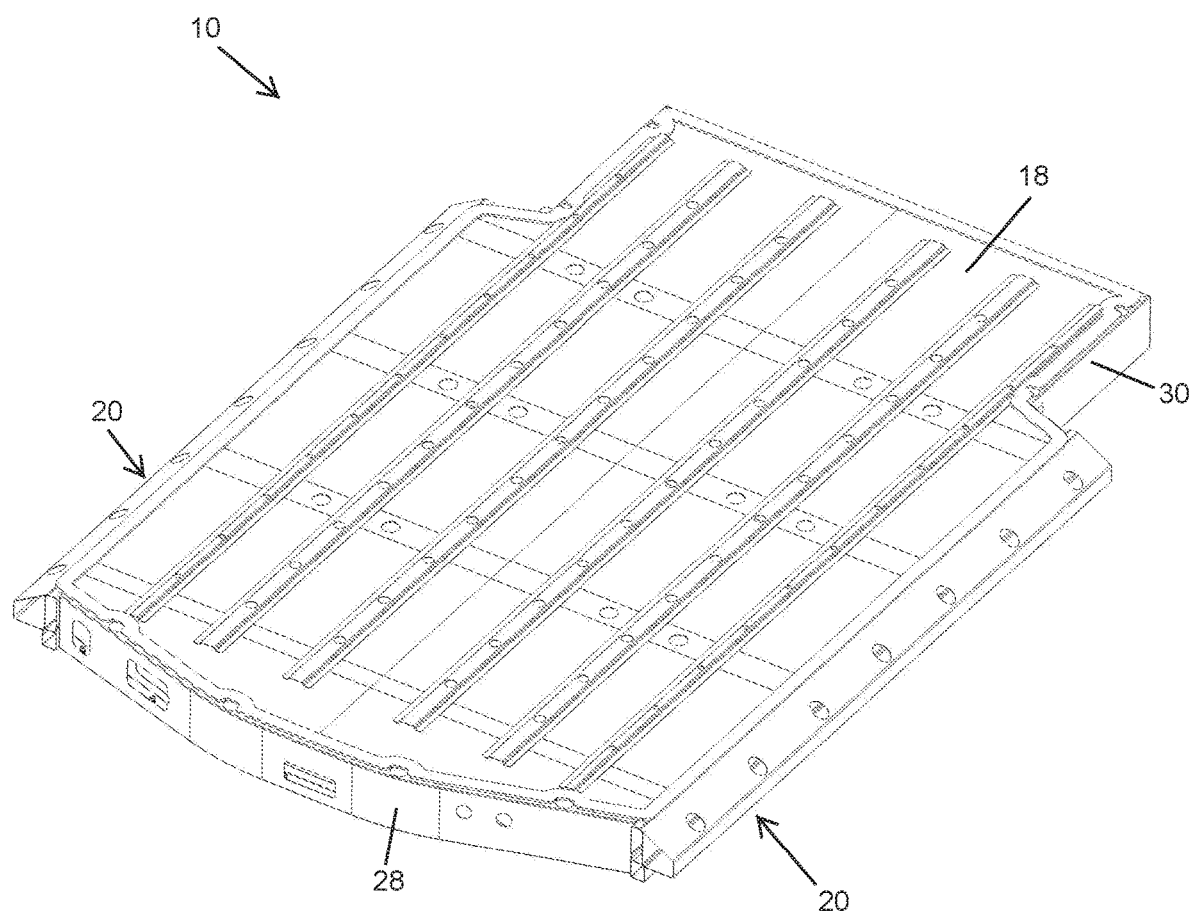
FIG. 10 is a lower perspective view of the battery support structure shown in FIG. 3.
Figure 18A:
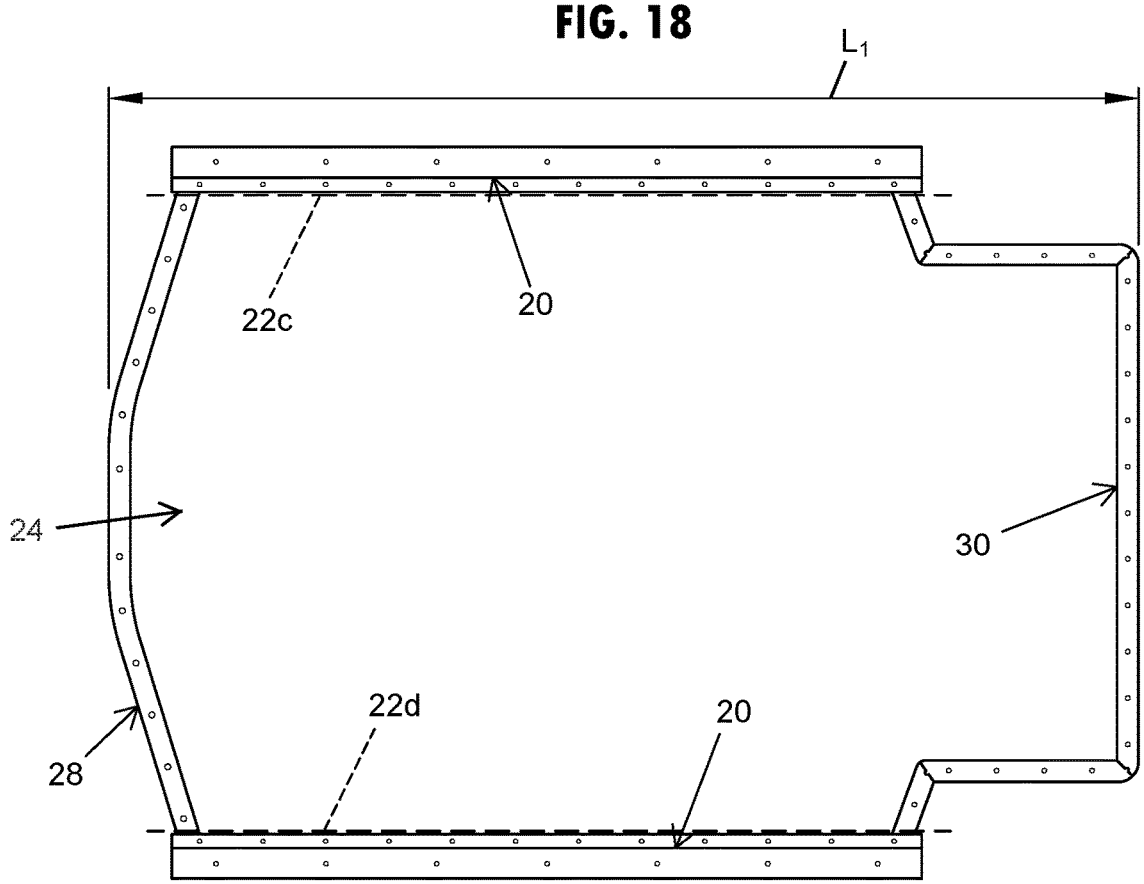
FIG. 18A is a top plan view of the side reinforcement members and the front and rear members of the battery support structure shown in FIG. 18.

The battery containment area 24 of the battery support structure 10 is generally bound on four sides, as shown in FIGS. 2 and 3, by the two side reinforcement members 20 and by a front member 28 and a rear member 30 that each extend laterally between the side reinforcement members 20. Ends of the front and rear members 28, 30 engage at a generally vertical inside surface of the side reinforcement members 20, thereby forming slip planes 22c, 22d (FIG. 18) between ends of the front and rear members 28, 30 and the inside surface of the side reinforcement members 20. Thus, prior to fixed attachment of the front and rear members 28, 30 to the side reinforcement members 20, these slip planes 22c, 22d permit longitudinal adjustment of the front and rear members 28, 30 relative to the side reinforcement members 20 to precisely conform to a predefined longitudinal length or dimension of the battery containment area 24. For example, the longitudinal length $L_1$ of the battery containment area 24, such as shown in FIG. 18A, can be adjusted to a shorter longitudinal lengths $L_2$ of the battery containment area 24 by, prior to fixed attachment, adjusting the abutting position of the ends of the rear member 30 on the opposing side members 20 about the generally vertically oriented slip planes 22c, 22d to provide a precise desired longitudinal length of the containment area 24.

Figure 15:
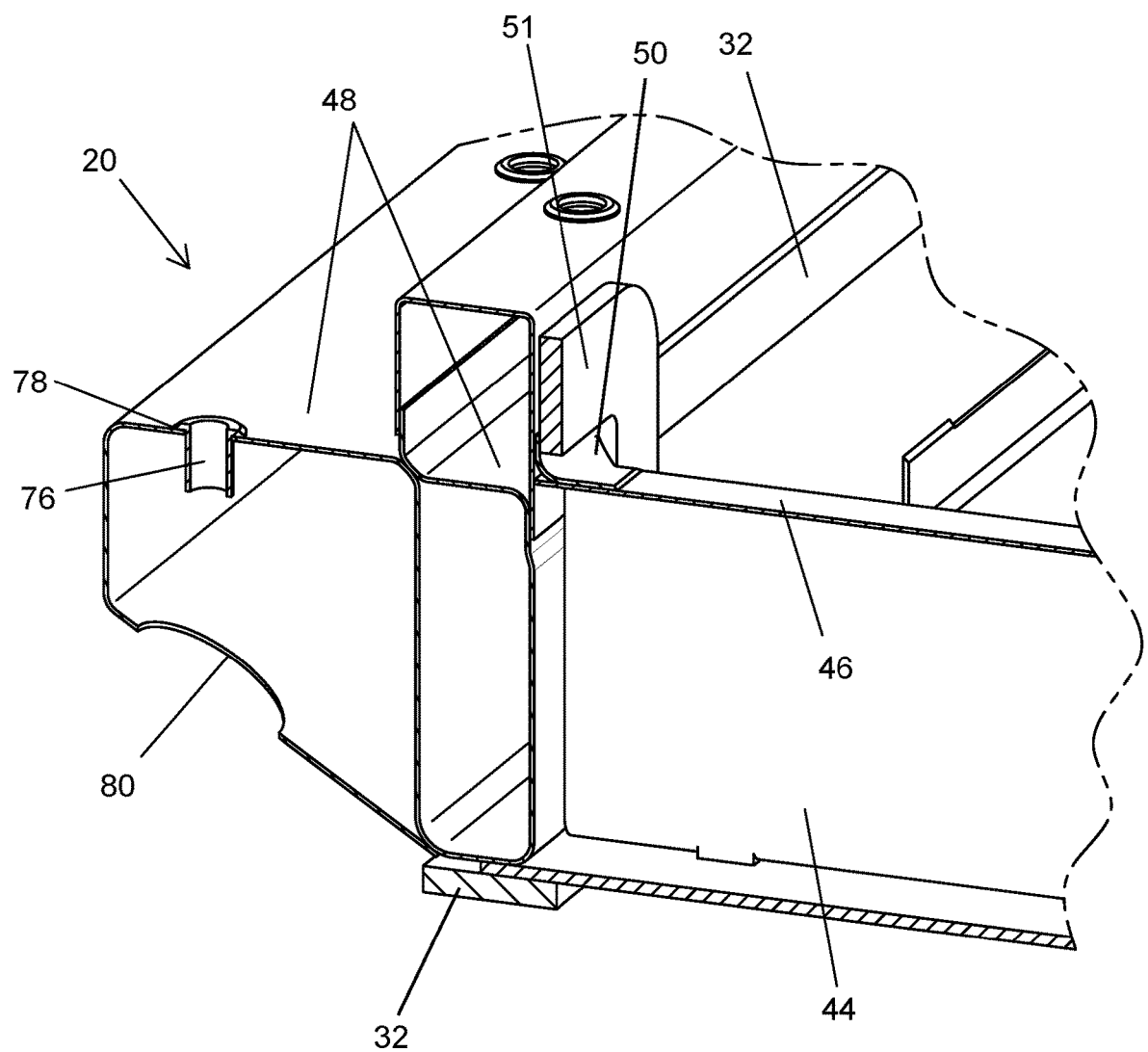
FIG. 15 is a cross-sectional upper perspective view of a portion of the battery support structure shown in FIG. 13, taken at line XV-XV shown in FIG. 14.

The front and rear members 28, 30 may be formed with a generally consistent rectangular shaped cross section with a fixed height that respectively defines the height of the front and rear portions or walls of the battery containment area 24. The side reinforcement members 20, as illustrated, are formed to provide a height that is substantially identical to the fixed height of the front and rear members 28, 30, such that there is generally a constant height about the peripheral walls of the battery containment area 24. This consistent peripheral wall height provides even or generally flush top and bottom surfaces of the peripheral walls for attaching a top cover or plate at the top surfaces and a bottom cover or base plate 18 at the bottom surfaces, which together seal the upper and lower portions of the battery containment area. The top cover is generally attached in a manner that is relatively easy to remove while maintaining the sealed battery containment area, such as via bolts or screws or other removable fasteners that may compress a gasket or other sealing member between the top cover and the top surface of the peripheral walls, so as to be able to remove the top cover and access the battery modules or other electric components housed in the battery containment area 24 for replacement, maintenance, or inspection or the like. The illustrated base plate 18 attaches at and spans generally below the side reinforcement members 20 and the front and rear members 28, 30 to provide a bottom surface of the battery containment area 24 and a generally sealed interior lower portion of the battery containment area 24. The base plate 18 may be attached to provide the sealed connection along the bottom surface of the peripheral walls via welding, adhesive, bolts, screws, and/or fasteners or the like. As shown in FIG. 15, the seal between the base plate 18 and the side reinforcement members may be reinforced or supplemented with a sealing agent or sealing material 32, such as an epoxy or silicone sealant or the like.

Figure 14:
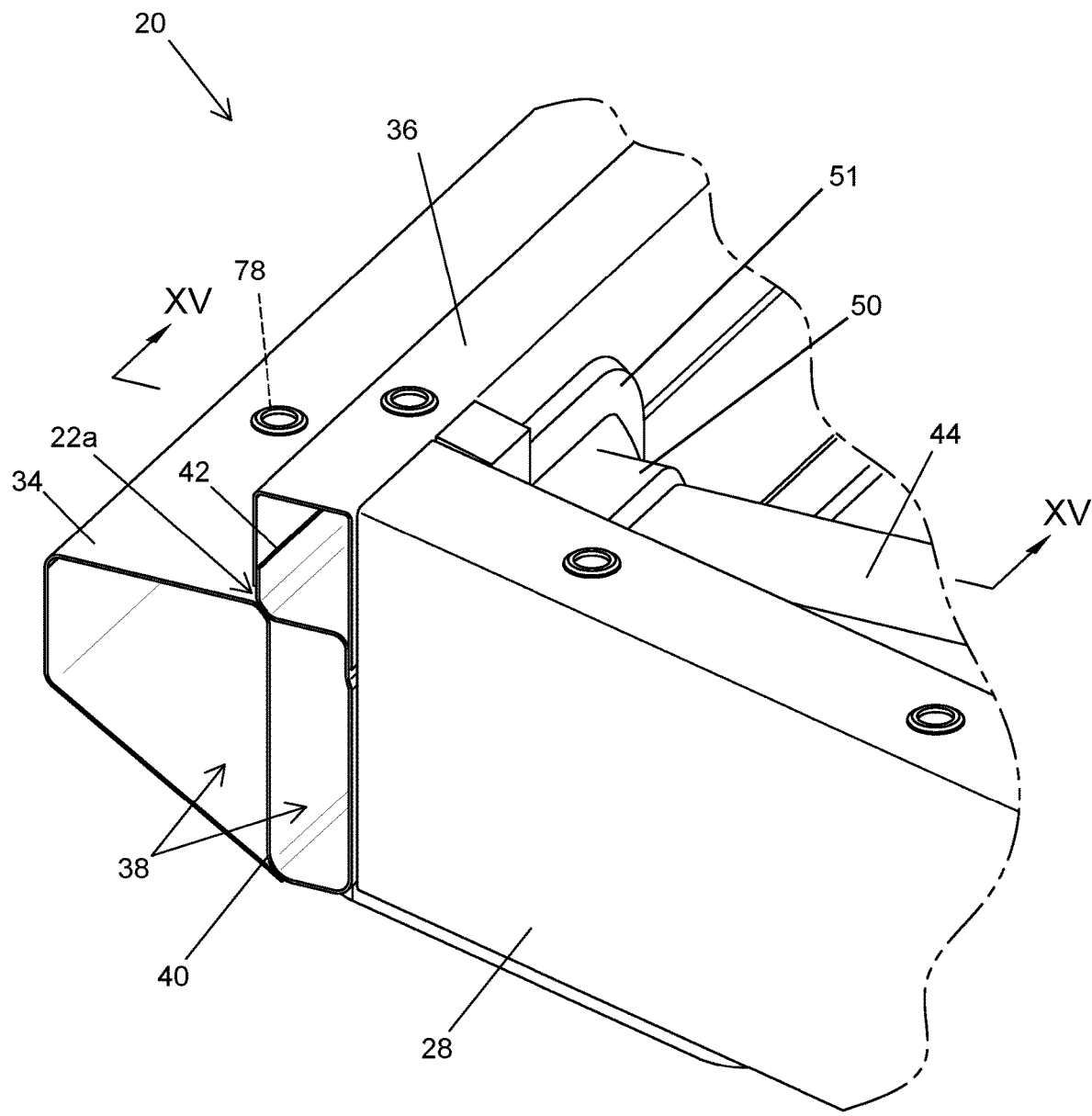
FIG. 14 is an enlarged upper perspective view of a front corner portion of the battery support structure shown in FIG. 13.

To form the side reinforcement members 20 with tight and precise dimensional control, such as for providing the height that is substantially identical to the fixed height of the front and rear members 28, 30, the side reinforcement members 20 may be formed with a base beam 34 and an upper cap or beam 36 that are attached to each other about a vertical slip plane 22a, to allow for vertical adjustment prior to welding or fixed attachment, such as about 2-3 millimeters of adjustable vertical range. As shown in FIG. 14, the base beam 34 is formed from a metal sheet to provide adjacent tubes 38 that include a common center wall 40 and a flange 42 extending upward near the common central wall 40. The upper beam 36 engages along the flange 42 of the base beam 34 to define the substantially vertical slip plane 22a used for vertically adjusting the upper beam 36 relative to the base beam 34 to achieve a selected height of the side reinforcement member 20 that corresponds to the height of the front and rear members 28, 30. It is also contemplated that the side reinforcement members may be formed as a single beam, such as an extruded or pultruded beam or a beam that is roll formed from a single sheet of metal or the like. The metal sheet that may form the base beam 34 of the side reinforcement members 20 may comprise a high strength steel, such as a cold worked martensitic steel.

Figure 16:
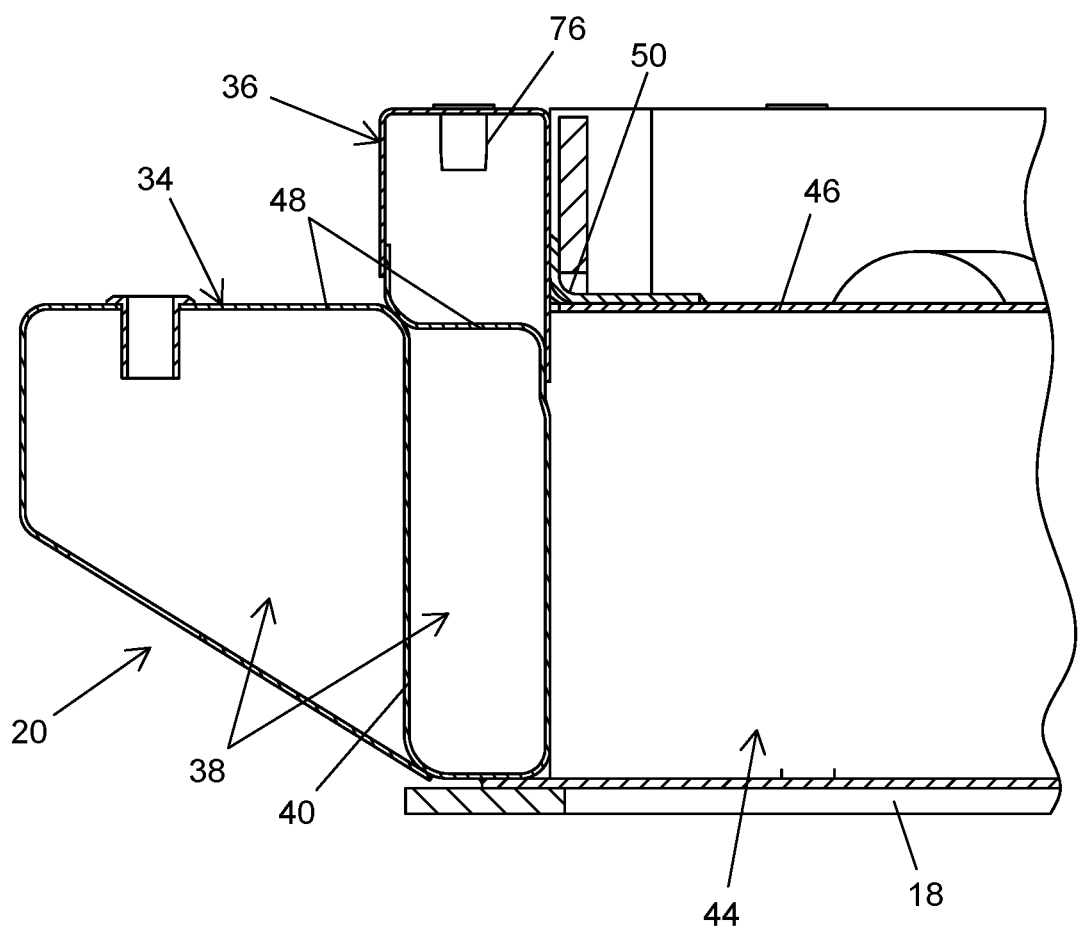
FIG. 16 is a cross-sectional front elevational view of the portion of the battery support structure shown in FIG. 15.

Referring again to FIGS. 2-8, the battery support structure 24 also includes cross members 44 that extend laterally to attach between the inside surfaces of the side reinforcement members 20. The cross members 44 span between the side reinforcement members 20 to transmit lateral loads and impact forces through generally linear load paths along the cross members 44 to prevent laterally inward deformation to the side reinforcement members 20 and thus limit disruption to the battery containment area 24. The cross members 44 may be formed to have a height less than the height of the peripheral walls of the battery containment area 24 and instead to have a height that is generally aligned with the base beam 34 of the side reinforcement members 20, such as shown in FIGS. 15 and 16. Accordingly, the upper walls 46 of the cross members 44 may generally align with the upper walls 48 of the base beam 34 to provide a direct load path transmission between these beams.

Figure 13:
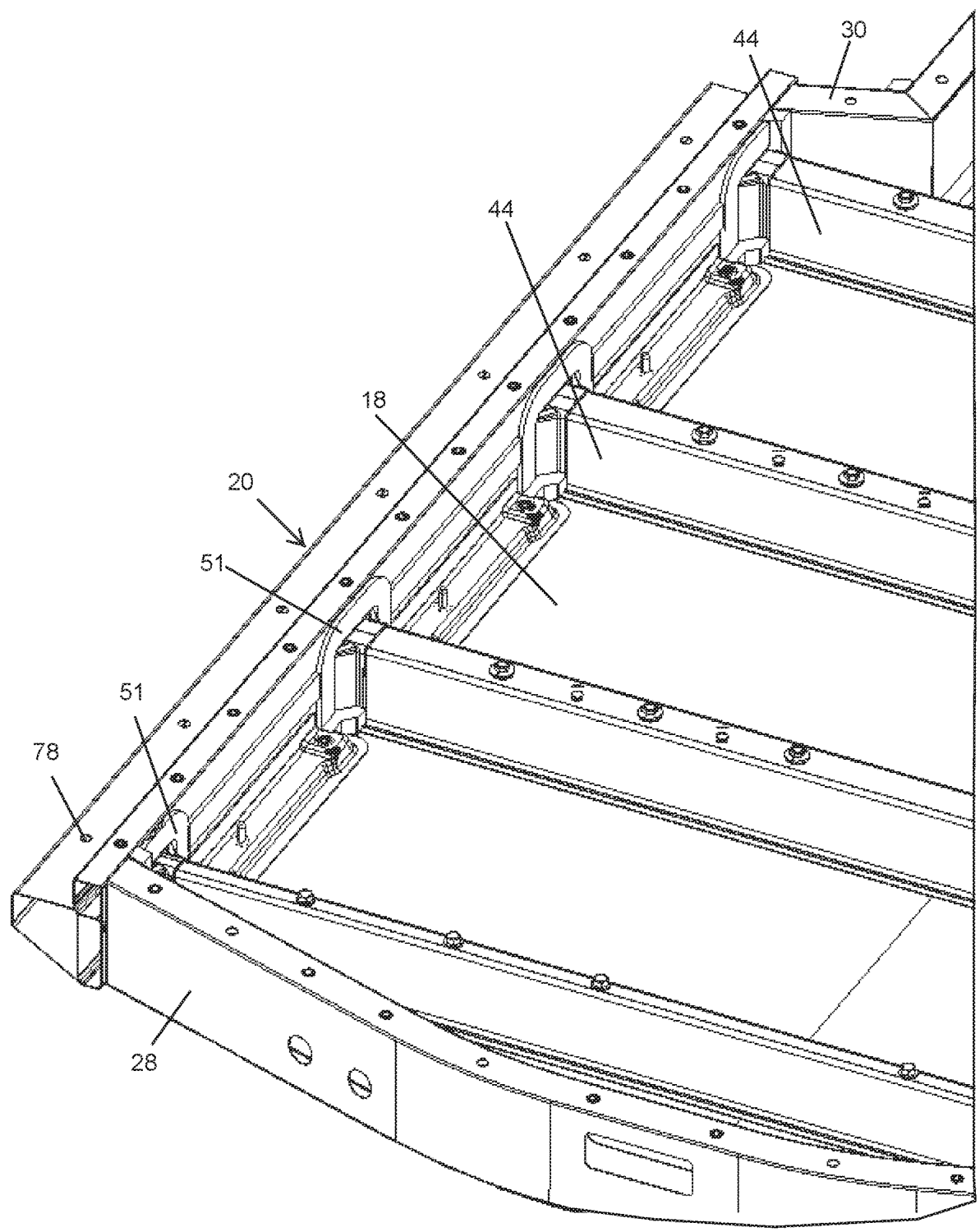
FIG. 13 is an enlarged upper perspective view of a portion of the battery support structure shown in FIG. 3, illustrating a connection interface between cross members and a side reinforcement member.

As further shown in FIGS. 13-15, the cross members 44 attach at the inside vertical surfaces of the side reinforcement members 20 and may attach with additional support provided with brackets 50. Also, a sealing agent or sealing material 51 (FIG. 3), such as an epoxy or silicone sealant or the like, may be provided around the brackets 50 and/or at other seams at or along the side reinforcement members 20 or other components within the battery containment area to reinforce the seal along the inside wall surface of the side reinforcement members 20.

Figure 17:
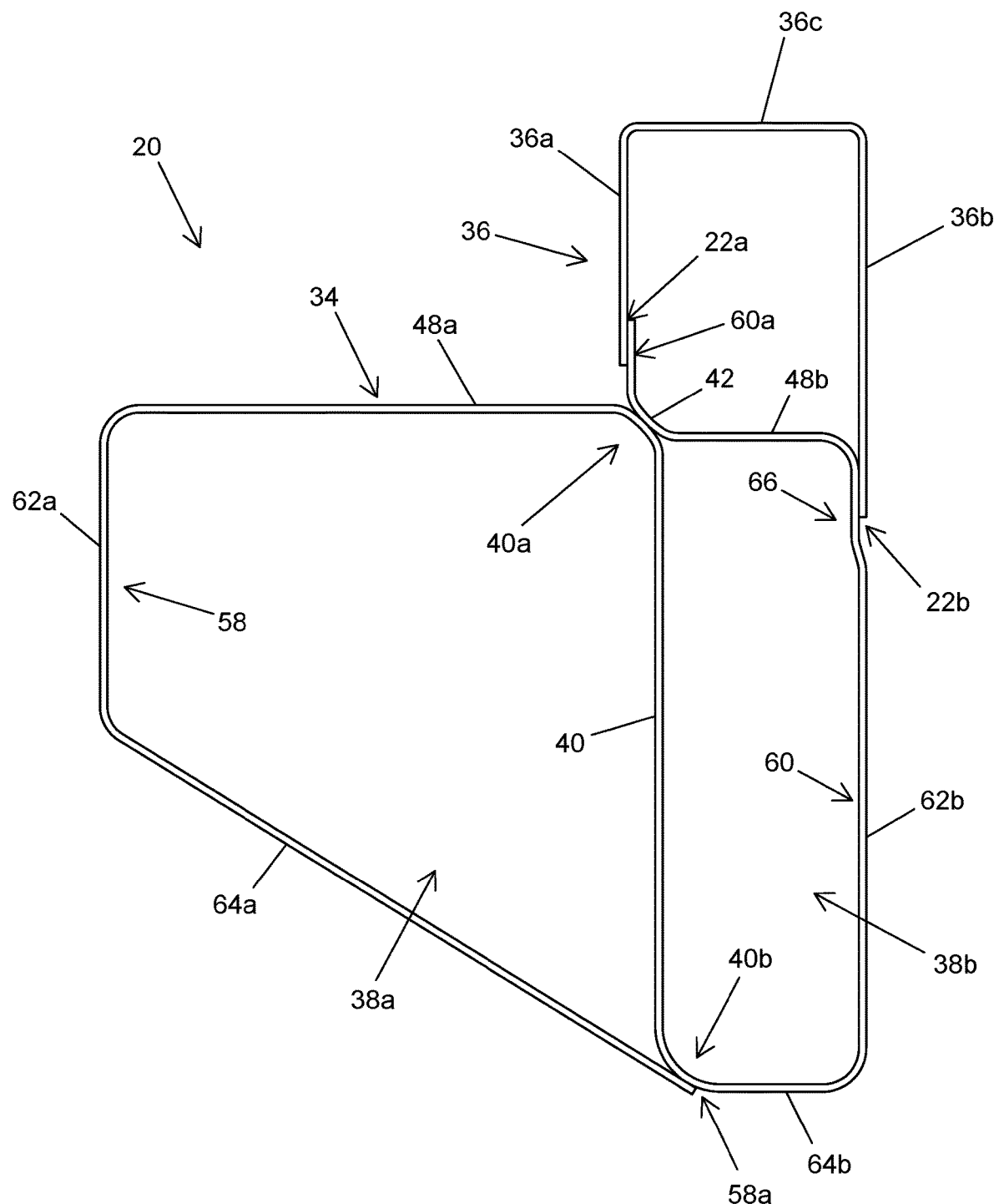
FIG. 17 is a front elevational view of the side reinforcement member shown in FIG. 16.

With respect to the side reinforcement members 20, the base beam 34, such as shown in FIG. 17, may be formed from a metal sheet to provide adjacent tubes 38 that include a common center wall 40 disposed in a generally vertical orientation. In doing so, lateral portions 58, 60 of the metal sheet that extend from opposing sides of the common center wall 40 are bent generally simultaneously in the same rotational direction to attach respectively at an upper end 40a and a lower end 40b of the common center wall 40 (FIG. 17). The outer lateral portion 58 of the metal sheet extends outward (relative to the vehicle and the battery support structure) from the upper end 40a of the center wall 40 to provide the outer upper wall 48a that is generally perpendicular to the vertical center wall 40. The outer lateral portion 58 is bent downward from the outer upper wall 48a to define the outward outside wall 62a of the base beam 34 having a generally vertical orientation and then bent inward at a downward angle to form an angled lower wall 64a. The angled lower wall 64 then attach the free edge 58a of the outer lateral portion 58 at the radiused corner formed at the lower end 40b of the center wall 40. It is also contemplated that the free edge may be bent upward into the interior volume of the outer tube 38a and attached at the center wall 40. Further, it is contemplated that the cross-sectional shape of the outer tube 38a may be altered from the illustrated embodiment shown in FIG. 17.

As further illustrated in FIG. 17, the inner lateral portion 60 of the metal sheet extends inward (relative to the vehicle and the battery support structure) from the lower end 40b of the center wall 40 to provide an inner bottom wall 64b of the side reinforcement beam that is generally perpendicular to the vertical center wall 40. The inner lateral portion 60 is bent upward from the inner bottom wall 64b to define the opposing outside wall 62b of the base beam 34 having a generally vertical orientation. At an upper portion of the outside wall 62b, the metal sheet is bent toward the center wall 40 to form an inner upper wall 48b that attaches at the radiused corner formed at the upper end 40a of the center wall 40. The inner lateral portion 60 of the metal sheet that attaches at the upper end 40a of the common center wall 40 includes a free edge 60a that extends upward near the common center wall beyond the attachment with the upper end 40a of the center wall 40 to provide the flange 42 along an upper portion of the base beam 34. Accordingly, the flange 42 extends longitudinally along the length of the base beam 34. It is conceivable that the flange 42 may be angled from the vertical orientation and/or may attach at the outer upper wall 48a or lower on the common center wall 40. Further, it is contemplated that the cross-sectional shape of the inner tubes 38b may be altered from the illustrated embodiment shown in FIG. 17.

The side reinforcement member 20, as illustrated in FIG. 17, may also include an upper beam 36 that attaches along the flange 42 of the base beam 34, where a slip plane 22a is defined along the flange 42. Prior to welding the upper beam 36 to the flange 42, the upper beam 36 may be vertically adjusted relative to the base beam 34 about the slip plane 22a to provide a selected height of the overall side reinforcement member 20 that corresponds to the height of the front and rear members 28, 30 of the vehicle battery support structure 10. Specifically, the upper beam 36 includes a transverse cross section with an inverted U-shape with a first leg 36a that engages the flange 42 to define a first slip plane 22a and a second leg 36b that engages the outside wall 62b to define a second slip plane 22b substantially parallel to the first slip plane 22a. The upper beam 36 is then vertically adjusted relative to the base beam 34 about the first and second slip planes 22a, 22b to a selected height between a top surface of the upper beam 36 and a bottom surface of the base beam 34 that is configured to correspond to the fixed height of the peripheral walls or otherwise ensure that the peripheral walls of the battery support structure 10 have a the fixed height capable of forming a sealed interface with the base plate 18. Upon achieving the precise selected height, the upper beam 36 may be attached, such as by welding along the first and second legs of the upper beam to the flange an outer sidewall 62b of the base beam 34 at the selected height.

In the illustrated embodiment, the first and second legs 36a, 36b of the upper beam 36 include bend radii at a top section 36c of the upper beam 36 that interconnects the first and second legs 36a, 36b. The bend radii of the upper beam 36 is smaller than the bend radii formed in the base beam 34 to provide the substantially planar top surface of the top section 36c of the upper beam 36 with a larger surface area for attaching the top cover. The top surface of the top section 36c also aligns with top surfaces of the front and rear members 28, 30. To allow the tighter bend radiuses at the upper beam 36, the upper beam 36 may comprise a metal material having a tensile strength of at most about 1000 MPa and more preferably about 900 MPa, while the base beam 34 may comprise a metal material having a tensile strength of at least about 1100 MPa and more preferably about 1500 MPa. Also, the second leg 36b is shown being longer than to the first leg 36a to extend down to the side surface of the outer sidewall 62b. The upper end of the outer sidewall 62b includes a slight outward bend or recessed area 66 having a depth substantially equal to the thickness of the metal sheet for engaging the second leg 36b and substantially aligning it with the mid and lower portions of the outer sidewall 62b.

In the illustrated embodiment, the thickness is approximately 1 millimeter, but it is contemplated that the thickness may vary from between about 0.5-3 millimeters. Thus, the upper beam 36 is attached over the inner tube 38b, such that the outer tube 38a is configured to attach at a rocker rail of a vehicle.

Figure 20:
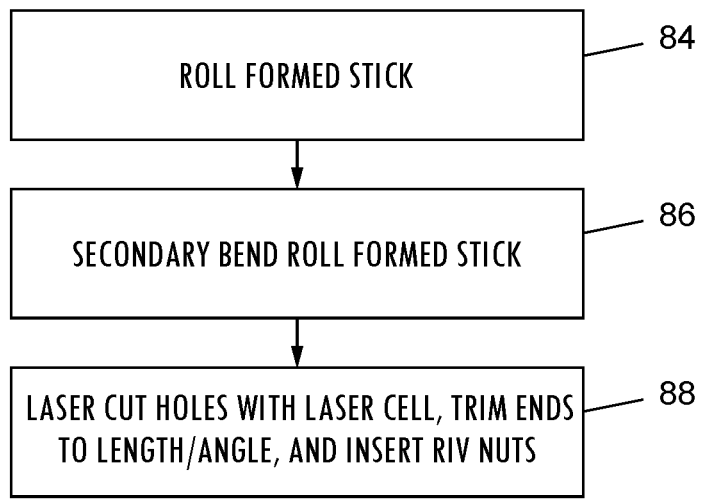
FIG. 20 is a flow chart of the process of forming a front member of the batter support structure.
Figure 20A:
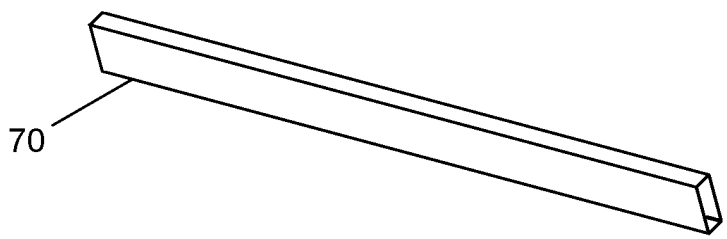
FIGS. 20A-20C are upper perspective views of the front member at different steps of the forming process shown in FIG. 20.
Figure 20B:
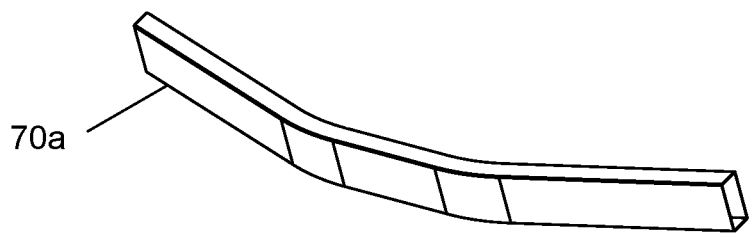
Figure 20C:
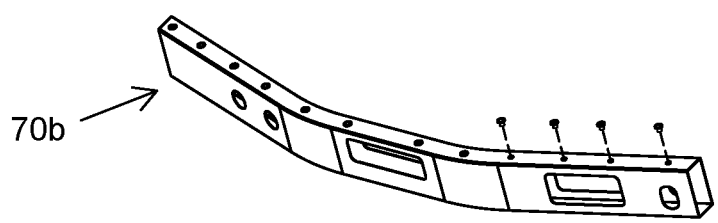

Referring now to FIGS. 20-24, exemplary illustrations are provided of an assembly process for the subassembly components that together form the peripheral sidewalls or cell of the battery support structure 10. More specifically, as illustrated in the flow chart in FIG. 20, the front member 28 is a subassembly component that may initially be provided at step 84 as a roll formed beam 70, such as shown in FIG. 20A, having a generally rectangular cross sectional shape. The roll formed beam 70 may then be bent in a secondary step 86, such as to provide two bends along the beam 70a, such as shown in FIG. 20B, which results in a forward protruding curvature. It is also contemplated that a sweep station or bending station may be provided at an end of a roll former line to provide these bends or an alternative bend or bends in the beam prior to the beam being cut to a desired length. At step 88, holes are laser cut with a conventional laser and ends of the beam 70b are trimmed, such as shown in FIG. 20C, to provide the precise angle for providing a front member (FIG. 24) that attaches to the side reinforcement beams 20 at a precise position on the slip planes 22c, 22d to provide the precise longitudinal length that generally corresponds with the shape of the vehicle and its battery packaging envelope.

With reference again to the formation of a side members 20, as shown in FIG. 21, an exemplary flow chart is provided that shows the process of assembling one embodiment of a side member 20. At step 90, the base beam 34 may be roll formed, such as in the configuration shown and described above in reference to FIG. 17. Also at step 90, the cap or upper beam 36 is formed to correspond to the attachment points on the base beam 34, such as shown in FIG. 21. At step 92, upper surfaces of the base beam 34 and upper beam 36 may be laser cut to provide holes 78 for inserting riv nuts 76, which may be used as attachment points, such as for the rocker rails and additional components, such as the top cover. At step 94, the upper beam 36 may be adjusted about the slip planes 22a, 22b, as described above, and once precisely positioned, laser welded together to provide a side reinforcement member 20, such as shown in FIG. 21C.

Figure 22:
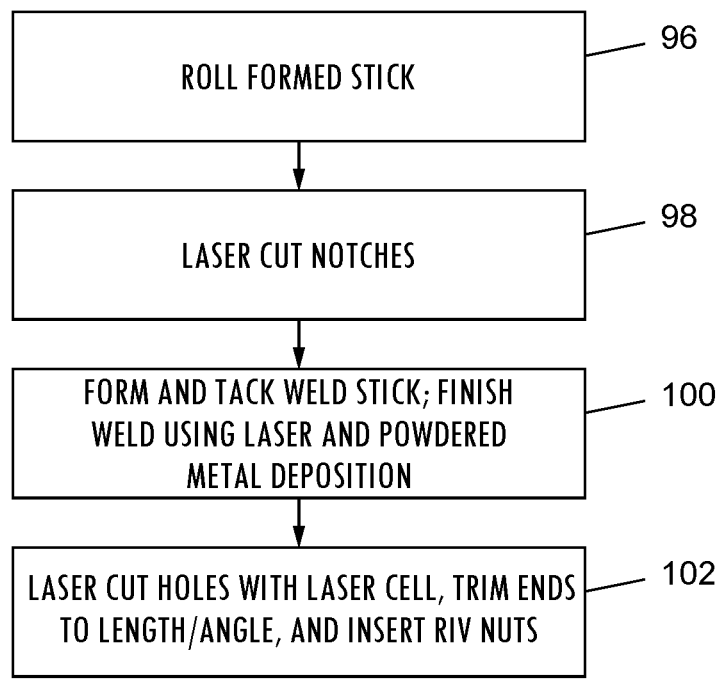
FIG. 22 is a flow chart of the process of forming a rear member of the batter support structure.
Figure 22A:
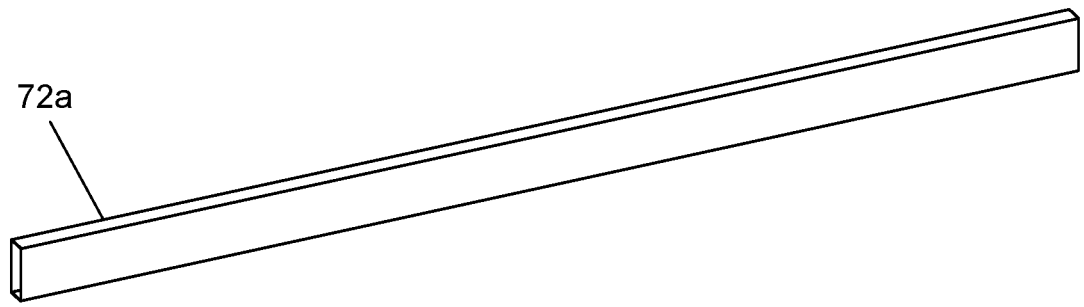
FIGS. 22A-22D' are upper perspective views of the rear member at different steps of the forming process shown in FIG. 22.
Figure 22B:
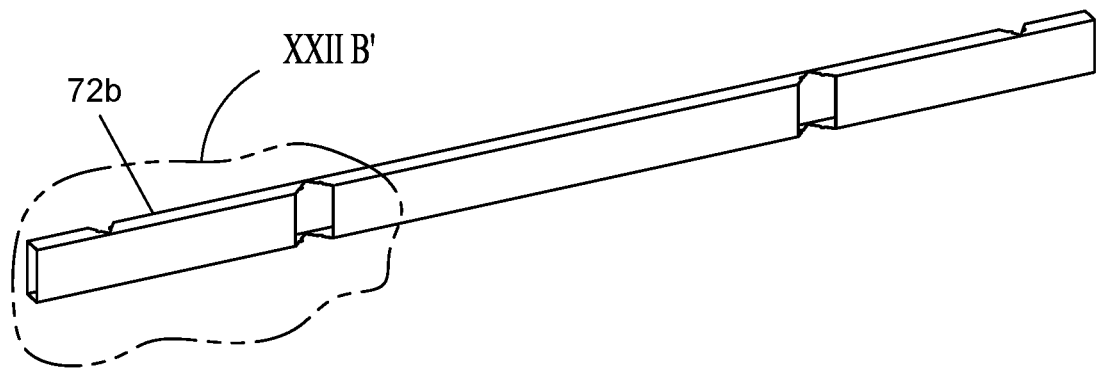
Figure 22B:
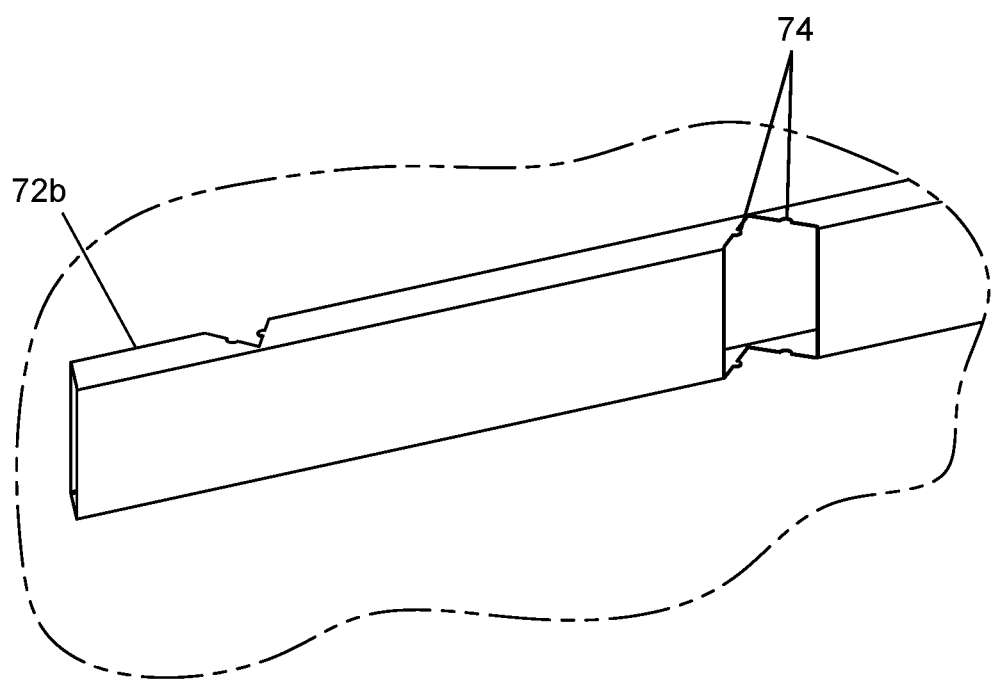
Figure 22C:
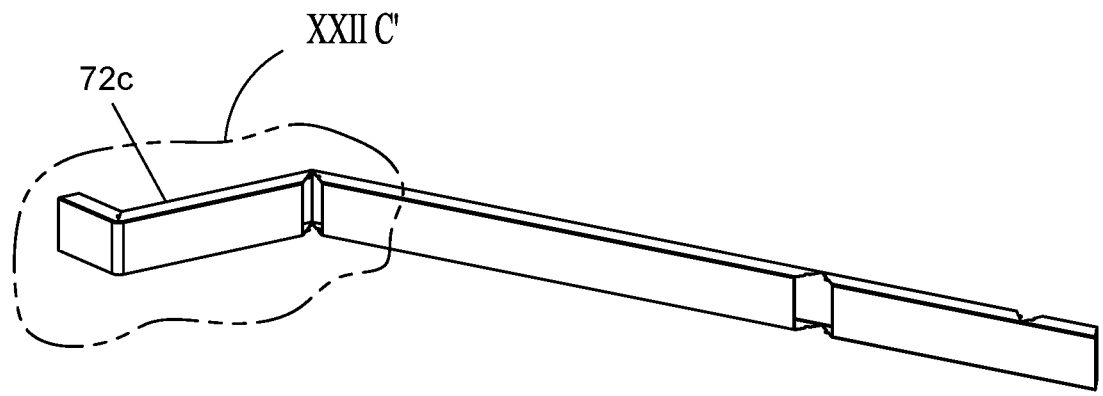
Figure 22C:
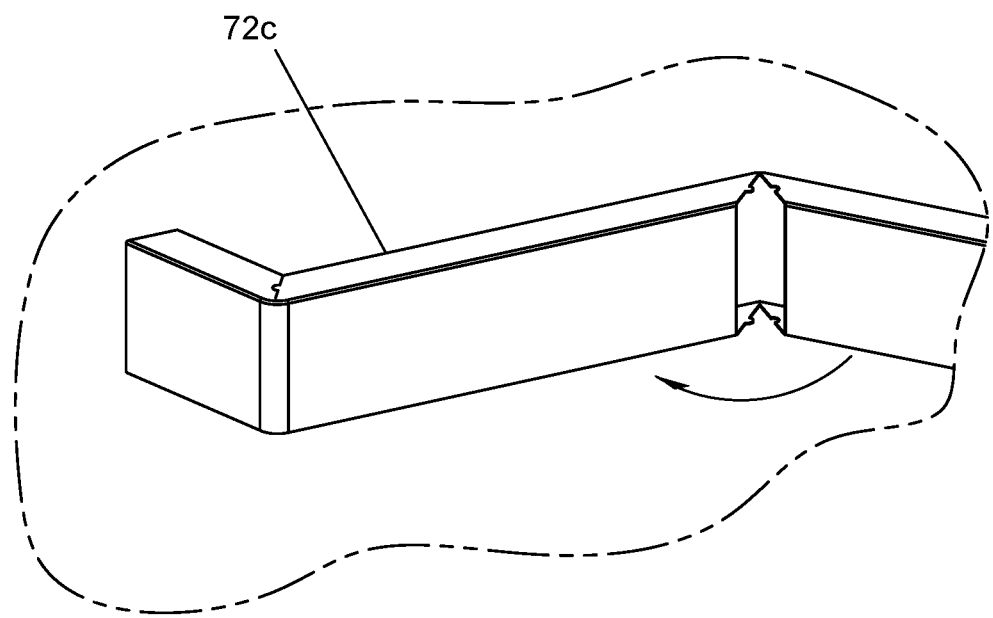
Figure 22D:
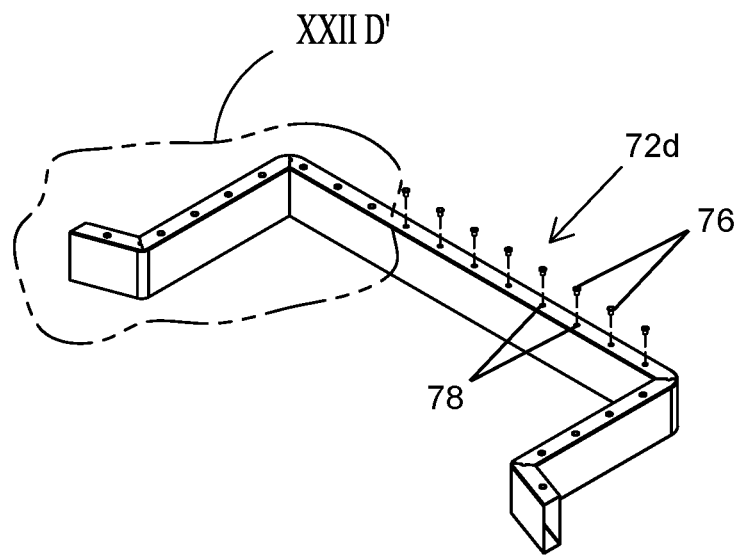
Figure 22D:
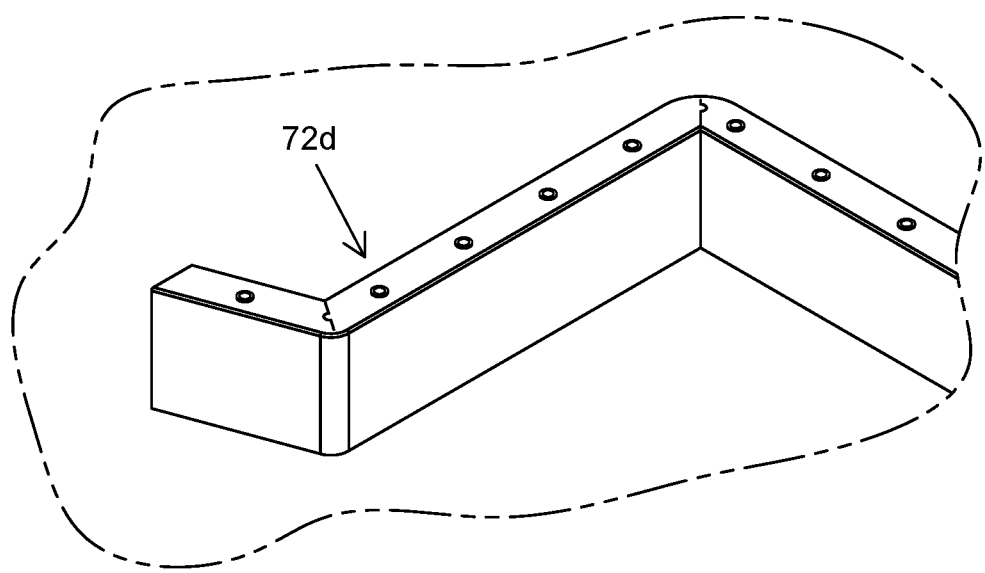

Further, as shown in FIG. 22, an exemplary flow chart is provided that shows the process of forming a rear member 30 subassembly component. At step 96, a roll formed beam 72a may be provided having a generally rectangular cross sectional shape, such as shown in FIG. 22A. The roll formed beam 72a, as step 98, may then be trimmed with a laser to provide notches along the beam 72b at the desired bending points that correspond to the shape and desired angular bends of the final rear member 30, such as shown in FIG. 22B and in more detail in FIG. 22B'. Specifically, the notches may remove material along three of the four walls, where the remaining wall portion may be the bending point and the top and bottom walls have angular cutouts that correspond to the desired angular transitions. Also, the notches at the top and bottom walls may include interlocking features 74 to provide a more stable welding joint. After the notches are formed, at step 100, the beam is bent at the bend points to close the notches along the beam 72c, such as shown in FIG. 22C and in more detail in FIG. 22C'. Accordingly, once the beam is bent, the closed notches are welded, such as by using a laser welding process with or without filler wire or powered metal deposition, the beam 72c is fixed in its bent configuration. At step 102, ends of the beam 72d are trimmed to provide the precise angle for attaching the ends to the side reinforcement beams 20 and to provide the precise length that generally corresponds with the width of the vehicle. Also, as shown in FIGS. 22D and 22D', riv nuts may also be inserted along the beam 72d to provide attachment points for additional components, such as the top cover.

In an additional embodiment, the rear member 30 may be a subassembly component that is made from separate pieces of a beam, such as five separate pieces of a roll formed beam, where the pieces may be laser cut to include the appropriate angle, such as to form miter joints between each piece of the rear member 30. After the angles are cut or otherwise formed on each separate piece of the beam, the joints are closed and attached together, such as by using a laser welding process with or without filler wire or powered metal deposition. Once the pieces are assembled and welded to form the rear member 30, the ends may be trimmed to provide the precise angle for attaching the ends to the side reinforcement beams 20 and to provide the precise length that generally corresponds with the width of the vehicle. Again with this embodiment, riv nuts 76 or other fasteners may also be inserted along hole 78 cut in the rear member 30 to provide attachment points for additional components, such as the top cover.

Figure 19:
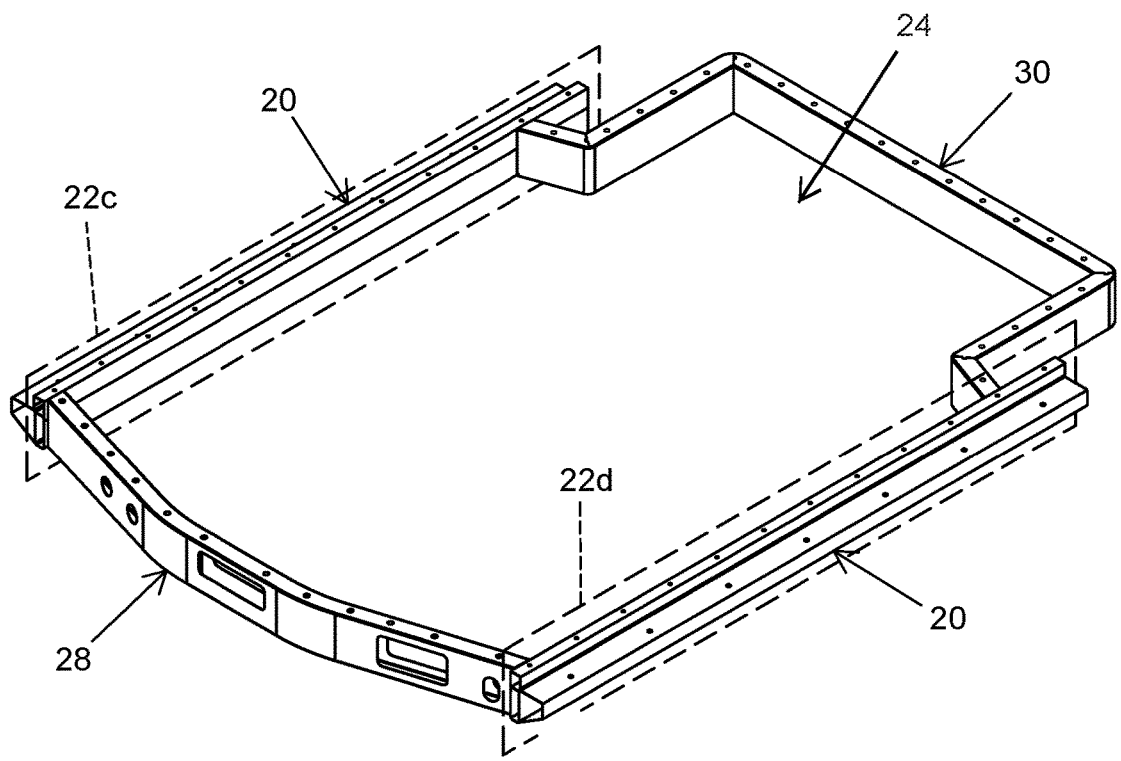
FIG. 19 is an upper perspective view of the side reinforcement members and the front and rear members of the battery support structure shown in FIG. 18, illustrating the rear member adjusted along the slip planes to a different position from that shown in FIG. 18.
Figure 19A:
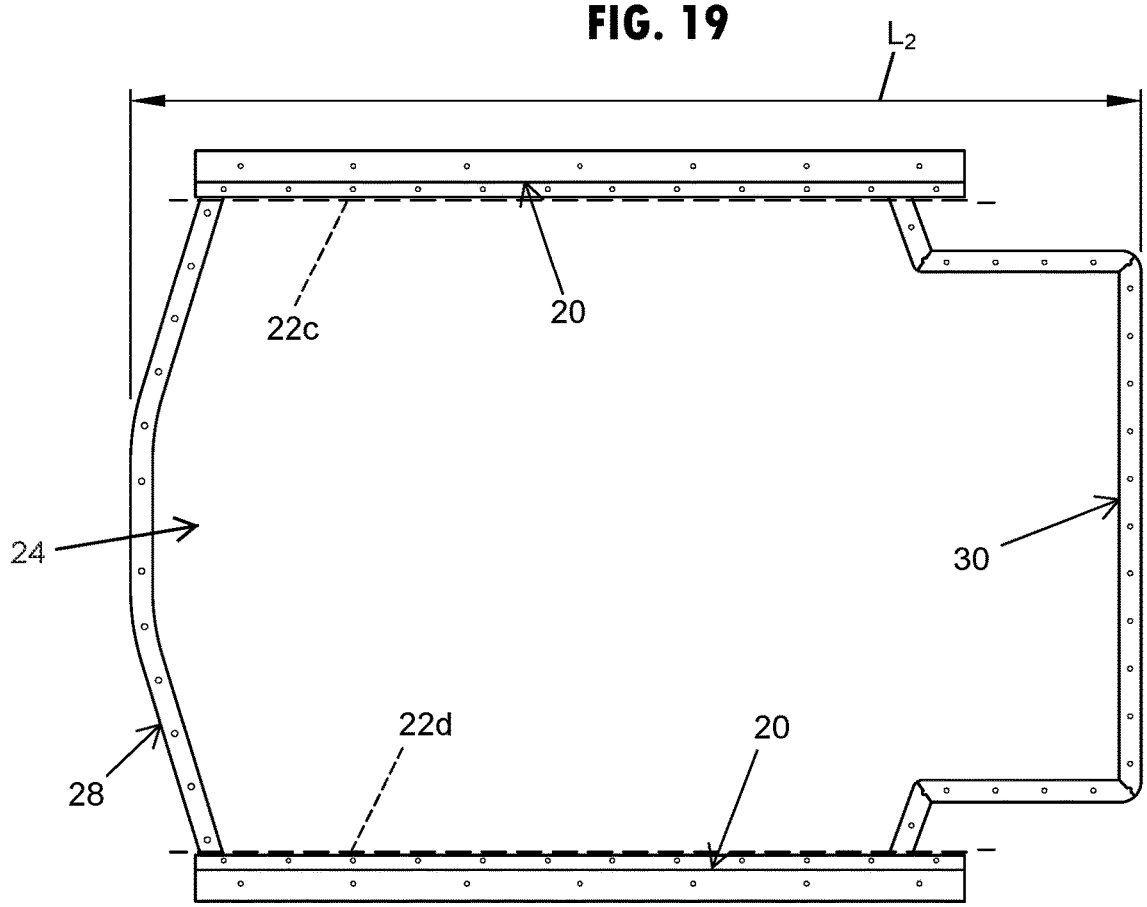
FIG. 19A is a top plan view of the side reinforcement members and the front and rear members of the battery support structure shown in FIG. 19.
Figure 23:
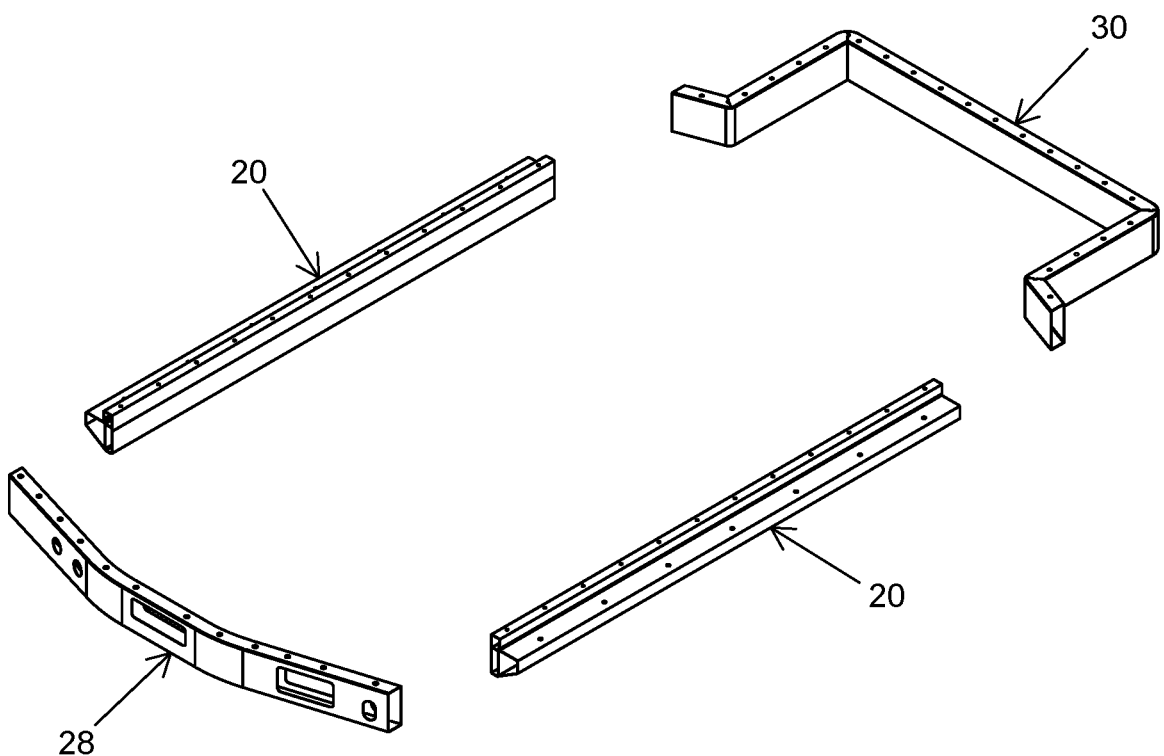
FIG. 23 is an exploded upper perspective view the side reinforcement members spaced away from the front and rear members of the batter support structure.
Figure 24:
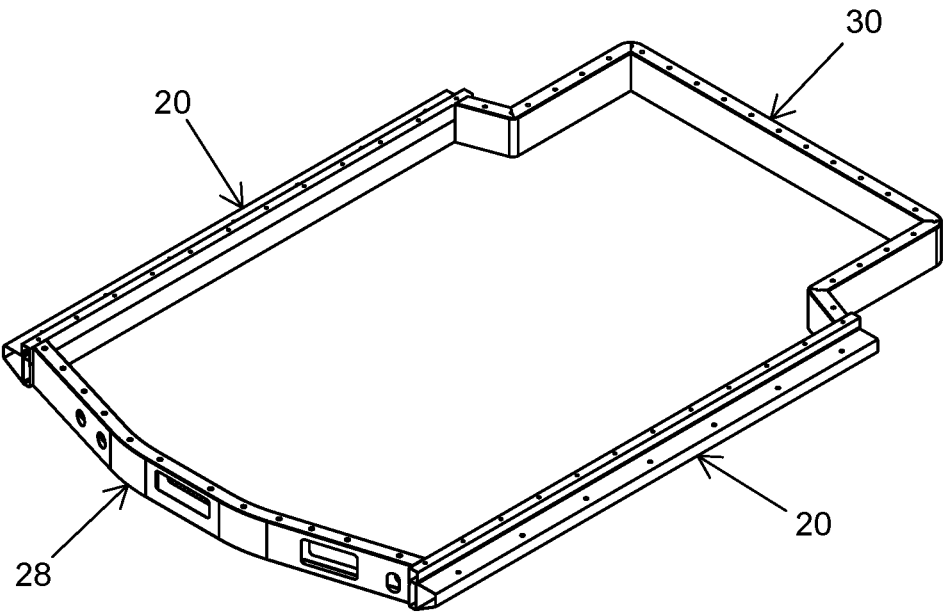
FIG. 24 is an upper perspective view the assembled batter support structure.

Referring now to the assembly of the battery support structure 10, such as shown in FIGS. 23 and 24, where a pair of side reinforcement members 20 are provided to attach at opposing rocker rails of a vehicle frame. Front and rear members 28, 30 may also be provided, and prior to fixed attachment with the side members 20, longitudinally adjusted along the slip planes 22c, 22d (FIG. 18-19A) defined between ends of the front and rear member 28, 30 and inside vertical surfaces of the pair of side reinforcement members 20 to a predefined longitudinal length or distance between the front and rear members 28, 30. Upon making the adjustment to the select longitudinal dimension, the front and rear members 28, 30 may be welded to the pair of side reinforcement members 20 to fix the predefined longitudinal distance between the front and rear members 28, 30 and to form a battery containment area 24. The base plate 18 may then be attached along lower surfaces of the pair of side reinforcement members 20 and the front and rear members 28, 30, such that the base plate 18 may span generally below the side reinforcement members 20 and the front and rear members 28, 30 to provide a bottom surface of the battery containment area 24. The cross members 44 may also be attached at and span laterally between the pair of side reinforcement members 20, such that lateral impact force may be transmitted through load paths along the plurality of cross members 44 to limit disruption to the battery containment area 24.

Figure 11:
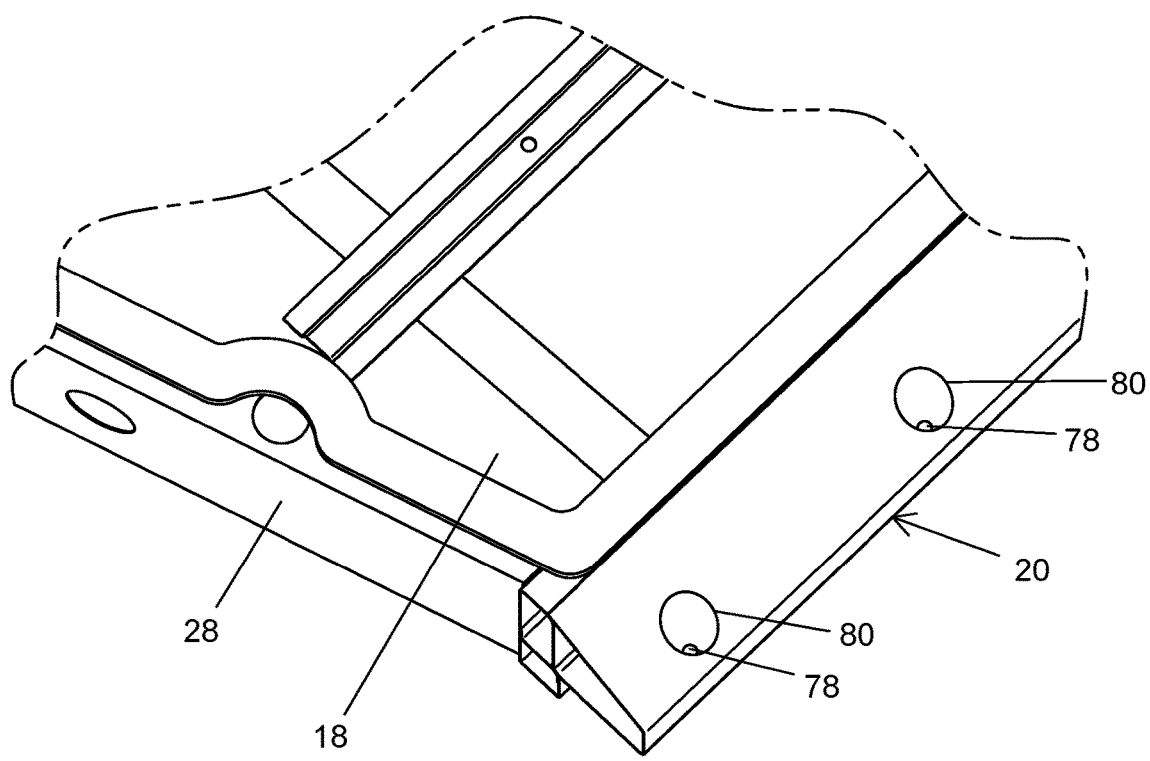
FIG. 11 is a lower perspective view of a front corner portion of the battery support structure shown in FIG. 10.

As also shown in FIGS. 11 and 22, the side reinforcement member has holes 78, 80 that are laser cut with a conventional laser. The holes 78 may be used, as shown in FIG. 12, for a bolt 82 or other fastener or the like to engage a rocker rail 14 of the vehicle frame. Accordingly, the other larger holes 80 may be used for a tool to access the bolts 82 or other fastener upon engagement or disengagement. Also, several different attachment techniques and configurations may be used to permanently or releasable secure the battery support structure to a vehicle frame, such as below a floor of the vehicle and generally between the axles. Further, with respect to the general installation or attachment or formation, the steps discussed herein may be performed in various different sequences from those discussed to result in engaging, disengaging, or forming the battery support structure or components thereof.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A battery support structure for a vehicle, the battery support structure comprising:
    a floor having a upper surface defining a bottom of a battery containment area disposed relative to a vehicle;
    a front peripheral frame member attached at a front edge of the floor;
    a rear peripheral frame member attached at a rear edge of the floor;
    a first side peripheral frame member attached at a first side edge of the floor;
    a second side peripheral frame member attached at a second side edge of the floor;
    wherein the front, rear, first side, and second side peripheral frame members are attached together to surround a periphery of the battery containment area;
    wherein the front peripheral frame member, first side peripheral frame member, and second side peripheral frame member each comprise a hollow tubular beam;
    wherein ends of the front peripheral frame member are attached to inboard surfaces of the first and second side peripheral frame members;
    wherein the first and second side peripheral frame members each have a substantially linear length and are substantially parallel to each other; and
    wherein the front peripheral frame member includes a curvature along a length of the front peripheral frame member.

2. The battery support structure of claim 1, wherein the curvature along the length of the front peripheral frame member protrudes forward from the battery containment area.

3. The battery support structure of claim 1, wherein the rear peripheral frame member comprises a hollow tubular beam.

4. The battery support structure of claim 1, wherein the curvature of the front peripheral frame member is configured to correspond with a shape of the vehicle.

5. The battery support structure of claim 1, wherein the front peripheral frame member comprises a rectangular transverse cross-sectional shape.

6. The battery support structure of claim 5, wherein a height of the front peripheral frame member is equal to a height of the first and second side peripheral frame members.

7. The battery support structure of claim 1, wherein the first and second side peripheral frame members each comprise a metal sheet formed to have at least one hollow interior extending longitudinally along the substantially linear length of the respective peripheral frame member.

8. The battery support structure of claim 1, wherein, prior to fixed attachment of the front peripheral frame member to the first and second side peripheral frame members, a slip plane is defined between the ends and the inside surfaces to adjust the position of the front peripheral frame member along a length of the side peripheral frame members to a predefined length of the battery containment area.

9. The battery support structure of claim 1, wherein the front peripheral frame member comprises a tubular beam formed from a single metal sheet to provide at least one hollow interior extending longitudinally along the front peripheral frame member.

10. A battery support structure for a vehicle, the battery support structure comprising:
    a floor having a upper surface defining a bottom of a battery containment area disposed relative to the vehicle;
    a plurality of peripheral frame members disposed along an outer edge of the floor to surround a periphery of the battery containment area, the plurality of peripheral frame members each comprising a hollow tubular beam;
    wherein opposing side frame members of the peripheral frame members are substantially parallel to each other;
    wherein ends of a front frame member of the peripheral frame members are attached to inboard surfaces of the opposing side frame members; and
    wherein the front frame member includes a forward protruding curvature along a length of the front frame member that extend the battery containment area forward.

11. The battery support structure of claim 10, wherein the front frame member comprises a single metal sheet formed to surround at least one hollow interior extending longitudinally along the length of the front frame member.

12. The battery support structure of claim 11, wherein the front frame member comprises a rectangular transverse cross-sectional shape.

13. The battery support structure of claim 12, wherein a height of the front frame member is equal to a height of the opposing side frame members.

14. The battery support structure of claim 13, wherein the opposing side frame members each have a substantially linear length.

15. The battery support structure of claim 14, wherein, prior to fixed attachment of the front frame member to the opposing side frame members, a slip plane is defined between the ends and the inboard surfaces to adjust the position of the front frame member along a length of the opposing side frame members to a predefined length of the battery containment area.

16. The battery support structure of claim 10, wherein the floor comprises a panel having stiffening channels disposed at a lower portion of the panel, and wherein a bottom surface of the plurality of peripheral frame members are attached along the outer edge of the panel with a sealed connection to provide a sealed interior lower portion of the battery containment area.

17. A battery support structure for a vehicle, the battery support structure comprising:
    a floor having a upper surface defining a bottom of a battery containment area;
    a plurality of peripheral frame members disposed along an outer edge of the floor to surround a periphery of the battery containment area, the plurality of peripheral frame members each comprising a hollow tubular beam;
    wherein ends of a first frame member of the peripheral frame members are attached via welding to inboard surfaces of adjacent frame members of the peripheral frame members;
    wherein the first frame member includes a swept curvature along a length of the first frame member that protrudes outward to expand the battery containment area; and
    wherein, prior to welded attachment of the first frame member to the adjacent frame members, a slip plane is defined between the ends and the inboard surfaces to adjust the position of the first frame member along a length of the adjacent frame members.

18. The battery support structure of claim 17, wherein the first frame member comprises a rectangular transverse cross-sectional shape.

19. The battery support structure of claim 17, wherein the adjacent frame members each have a substantially linear length and are substantially parallel to each other.

20. The battery support structure of claim 17, wherein the floor comprises a panel having stiffening channels disposed at a lower portion of the panel, and wherein a bottom surface of the plurality of peripheral frame members are attached along the outer edge of the panel with a sealed connection to provide a sealed interior lower portion of the battery containment area.

* * * * *